(12) United States Patent
Kisliakov

(10) Patent No.: US 7,689,619 B2
(45) Date of Patent: Mar. 30, 2010

(54) PROCESS AND FORMAT FOR RELIABLE STORAGE OF DATA

(75) Inventor: Andrew Kisliakov, Burwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 10/748,334

(22) Filed: Dec. 31, 2003

(65) Prior Publication Data

US 2004/0231001 A1 Nov. 18, 2004

(30) Foreign Application Priority Data

Jan. 14, 2003 (AU) .............................. 2003900137

(51) Int. Cl.
G06F 7/00 (2006.01)
H04N 7/173 (2006.01)
(52) U.S. Cl. .................... 707/741; 707/913; 707/104.1; 725/134
(58) Field of Classification Search ............... 707/1–10, 707/100–102, 104.1, 200–201, 736, 741, 707/913; 709/203, 217–224; 715/501.1, 715/51; 711/161, 162; 714/1, 2
See application file for complete search history.

(56) References Cited

U.S. PATENT DOCUMENTS

| | | | | |
|---|---|---|---|---|
| 5,237,156 | A * | 8/1993 | Konishi et al. | 235/375 |
| 5,751,280 | A * | 5/1998 | Abbott et al. | 715/500.1 |
| 6,018,744 | A * | 1/2000 | Mamiya et al. | 707/104.1 |
| 6,035,341 | A * | 3/2000 | Nunally et al. | 709/253 |
| 6,065,010 | A * | 5/2000 | Otsuka et al. | 707/101 |
| 6,065,050 | A * | 5/2000 | DeMoney | 709/219 |
| 6,079,566 | A * | 6/2000 | Eleftheriadis et al. | 707/101 |
| 6,178,536 | B1 | 1/2001 | Sorkin | |
| 6,282,549 | B1 * | 8/2001 | Hoffert et al. | 707/104.1 |

(Continued)

FOREIGN PATENT DOCUMENTS

JP 2001-45420 2/2001

(Continued)

OTHER PUBLICATIONS

"QuickTime File Format," Apple Computer, Inc., Mar. 2001 .(cover p. 2000), 306 pages.

(Continued)

*Primary Examiner*—Miranda Le
(74) *Attorney, Agent, or Firm*—Fitzpatrick, Cella, Harper & Scinto

(57) ABSTRACT

A method of generating a media file for display on a display device. The method includes the steps of (a) initializing the media file and an associated index file, the associated index file referencing the media file, and (b) inserting a plurality of video frames from a camera into the media file. The inserting step includes the steps of (i) determining if the media file is configured to accept the plurality of video frames, and (ii) configuring the media file, based on the determination step, such that the plurality of video frames is accepted by the media file. The method further includes the steps of (c) appending a text string having at least a time stamp of the inserting step to the plurality of video frames, to thereby generate the media file, the text string being adapted for reconstructing the associated index file upon corruption of the associated index file, wherein the reconstructed index file replaces the associated index file, wherein upon the media file and the associated index file being damaged.

3 Claims, 19 Drawing Sheets

U.S. PATENT DOCUMENTS

| | | | |
|---|---|---|---|
| 6,366,900 B1* | 4/2002 | Hu | 707/1 |
| 6,369,835 B1* | 4/2002 | Lin | 715/726 |
| 6,424,370 B1* | 7/2002 | Courtney | 348/143 |
| 6,453,355 B1* | 9/2002 | Jones et al. | 709/230 |
| 6,470,359 B1* | 10/2002 | Lyle | 707/202 |
| 6,654,933 B1* | 11/2003 | Abbott et al. | 715/203 |
| 6,665,835 B1* | 12/2003 | Gutfreund et al. | 715/202 |
| 6,804,302 B1* | 10/2004 | Yamada et al. | 375/240.16 |
| 6,877,134 B1* | 4/2005 | Fuller et al. | 715/500.1 |
| 6,937,766 B1* | 8/2005 | Wilf et al. | 382/229 |
| 6,947,044 B1* | 9/2005 | Kulas | 345/473 |
| 6,952,236 B2* | 10/2005 | Orr | 348/465 |
| 6,954,746 B1* | 10/2005 | Batista | 706/45 |
| 6,993,246 B1* | 1/2006 | Pan et al. | 386/52 |
| 7,023,469 B1* | 4/2006 | Olson | 348/152 |
| 7,024,609 B2* | 4/2006 | Wolfgang et al. | 714/748 |
| 7,035,526 B2* | 4/2006 | Green | 386/68 |
| 7,039,116 B1* | 5/2006 | Zhang et al. | 375/240.26 |
| 7,039,117 B2* | 5/2006 | Chan | 375/240.27 |
| 7,039,643 B2* | 5/2006 | Sena et al. | 707/101 |
| 7,072,575 B2* | 7/2006 | Kang | 386/125 |
| 7,075,985 B2* | 7/2006 | Lee | 375/240.12 |
| 7,124,427 B1* | 10/2006 | Esbensen | 725/109 |
| 7,148,908 B2* | 12/2006 | Riek et al. | 345/646 |
| 7,149,755 B2* | 12/2006 | Obrador | 707/104.1 |
| 2002/0003576 A1* | 1/2002 | Konishi et al. | 348/232 |
| 2002/0069363 A1 | 6/2002 | Winburn | |
| 2002/0093439 A1* | 7/2002 | Lundin et al. | 341/120 |
| 2002/0104096 A1* | 8/2002 | Cramer et al. | 725/113 |
| 2002/0178171 A1* | 11/2002 | Walker et al. | 707/102 |
| 2002/0180803 A1* | 12/2002 | Kaplan et al. | 345/810 |
| 2003/0009718 A1* | 1/2003 | Wolfgang et al. | 714/751 |
| 2003/0018581 A1* | 1/2003 | Bratton et al. | 705/50 |
| 2003/0033325 A1* | 2/2003 | van den Boogaard | 707/200 |
| 2003/0061369 A1* | 3/2003 | Aksu et al. | 709/231 |
| 2003/0080980 A1* | 5/2003 | Riek et al. | 345/646 |
| 2004/0028042 A1* | 2/2004 | Srinivasan et al. | 370/392 |
| 2004/0040041 A1* | 2/2004 | Crawford | 725/88 |
| 2004/0205655 A1* | 10/2004 | Wu | 715/530 |
| 2005/0022252 A1* | 1/2005 | Shen | 725/135 |

OTHER PUBLICATIONS

"QuickTime File Format," Apple Computer Inc., 2004 (cover page: Mar. 1, 2001), 288 pages.

Moccagatta et al., "Error-Resilient Coding in JPEG-2000 and MPEG-4", IEEE Journal on Selected Areas in Communications, vol. 18, Issue 6, Jun. 2000, pp. 899-914.

"Job Scheduler: How to Recover a Corrupted File in a Base on Windows", Evidian.News Online, www.evidian.com/newsonline/art040805.php, Sep. 2004.

* cited by examiner

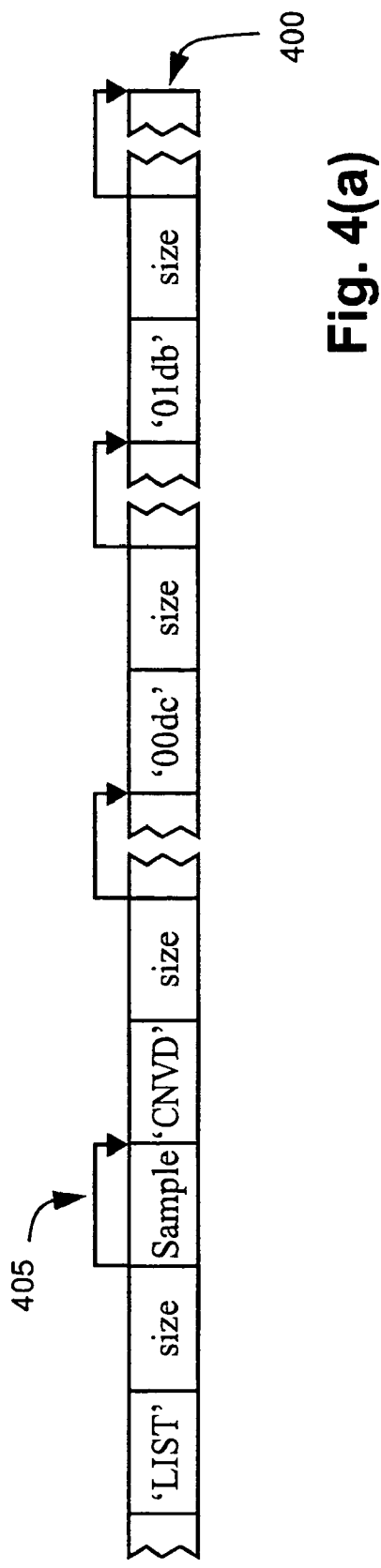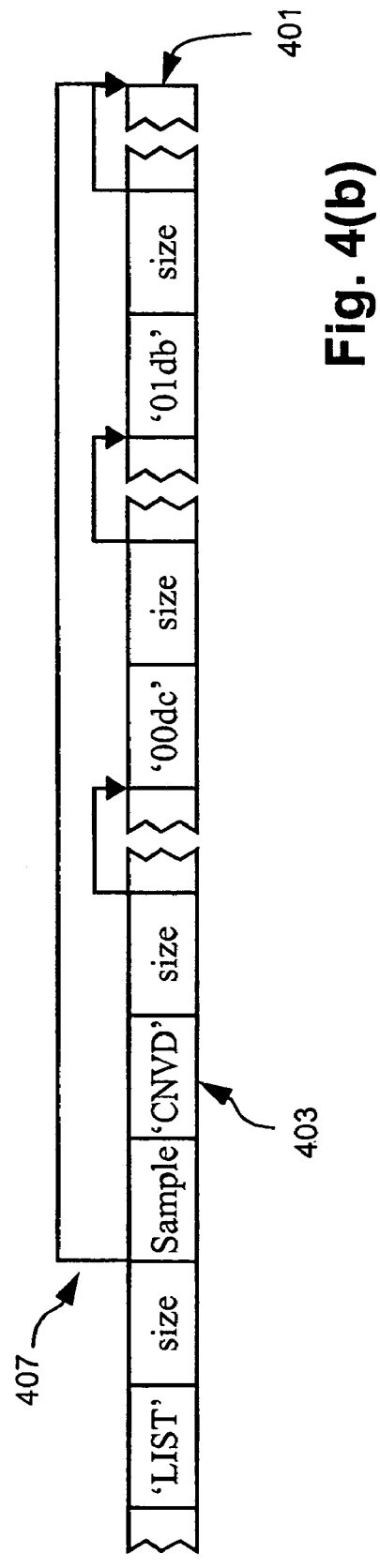

PROCESS AND FORMAT FOR RELIABLE STORAGE OF DATA

FIELD OF THE INVENTION

The present invention relates generally to video image processing and, in particular, to a process and apparatus for storing video and text data samples. The present invention also relates to a computer program product including a computer readable medium having recorded thereon a computer program for storing video and text data samples.

BACKGROUND

Due to recent world events, security has become a very important issue. As a result, video surveillance systems are increasingly being used both commercially and privately to monitor areas for security purposes.

Typically, a video surveillance system comprises one or more storage servers (i.e., generally implemented as a general-purpose computer as known to those in the relevant art), which receive data from one or more video cameras distributed on a computer network. There are a number of issues with controlling such video surveillance systems that are typically not as prevalent in other video recording applications. Firstly, it is important in security implementations to accurately establish the time at which an event occurred. Ideally, the frame rate of a network associated with a video surveillance system matches received data as closely as possible, to the point of catching the most minor of variations between the two. However, the reliability of video surveillance systems can be significantly reduced due to variability in frame rate of such an associated network, especially if the bandwidth of the network is close to being saturated. Entire frames can be lost due to such variability.

A second issue with video surveillance systems is the frequent changes in video properties that can occur with such systems. As a video surveillance system attempts to maintain a balance between recording size and video quality at important times, some aspects of captured video data, such as frame rate, resolution and compression ratio, can change dynamically.

In addition, the efficiency of video surveillance systems can be reduced due to the inefficient use of the memory resources of an associated network. For example, in order to support as many video cameras as possible on one network and to enable the cameras to work at adequate frame rates and resolution, the hard disk of an associated storage server must be adequately fragmented and utilised.

Finally, the recoverability of video surveillance systems in the event of a system failure, such as abnormal termination, is critical to the effectiveness of such a system. For example, during a power failure, as much data as possible should be recovered from any files that are left inconsistent or corrupt as a result of the system failure.

Various video surveillance systems have been developed in order to address the above issues. However, most of the existing systems, record and store video data in proprietary file formats. Such proprietary file formats cannot typically be viewed using standard media players.

One known file format used for video/audio data is the Microsoft™ AVI™ (Audio Video Interleave) file format. The AVI™ file format is a file specification used with an AVI™ media player application or any media player application that can read a file configured in accordance with the AVI™ file format. Such a media player application can be used to capture, edit, and play back video/audio sequences. In general, files configured in accordance with the AVI™ file format include multiple data streams (i.e., samples) containing samples of different types of data. Most AVI™ sequences use both audio and video streams. A simple variation of such an AVI™ sequence uses video data and does not require an audio stream.

The disadvantage of the AVI™ file format is that the format does not support variable frame rates and resolution within a data stream. As such the AVI™ file format is unsuitable for video surveillance applications.

Another known file format is the Apple™ QuickTime™ file format. Again, the QuickTime™ file format is a file specification used with a QuickTime™ media player application of the same name or any media player application that can read a file configured in accordance with the QuickTime™ file format. The QuickTime™ file format provides support for variable video frame rates and resolutions. A detailed description of the QuickTime™ file format can be found in the publication entitled "QuickTime File Format", published by Apple Computer Inc. The QuickTime File Format publication can be found at the website http://developer.apple.com/techpubs/quicktime/qtdevdocs/PDF/QTFileFormat.pdf, as of 9 Jan. 2003.

However, there is no structure specified for a media data area within the QuickTime™ file format. Accordingly, metadata that can be recognised by a QuickTime™ media player application, for example, can not be added to a file configured in accordance with the QuickTime™ file format.

Thus, a need clearly exists for a process for storing data and, in particular, video and text data samples, which allows video streams or samples to be captured and viewed using standard file formats and associated standard media players.

SUMMARY

It is an object of the present invention to substantially overcome, or at least ameliorate, one or more disadvantages of existing arrangements.

According to one aspect of the present invention there is provided a method of storing data, said method comprising the steps of:

generating at least one media file for storing data as one or more data samples; and generating at least one index file for storing information indicating the configuration of said one or more data samples of said media file, said media file further comprising additional information interspersed throughout said media file, wherein said additional information describes at least one property of said data samples and allows for reconstruction of said index file upon corruption thereof.

According to another aspect of the present invention there is provided a method of storing video and associated text data, said method comprising the steps of:

generating at least one media file in accordance with a first file format, said media file being configured for storing said video and associated text data as one or more data samples; and generating at least one index file in accordance with a second file format, said index file being configured to store information indicating the configuration of said one or more data samples of said media file; and adding additional information interspersed throughout said media file, said media file including said additional information being readable by a media player corresponding at least to said first file format, wherein said additional information describes at least one property of said data samples and allows for reconstruction of said index file upon corruption thereof.

According to still another aspect of the present invention there is provided a method of storing at least text data in one or more files as one or more data samples, said method comprising the steps of:

storing a text string in said file corresponding to at least one of said samples, in accordance with a first predetermined data format;

generating at least one copy of said text string; and storing said copy of said text string in said file in accordance with a second predetermined data format.

According to still another aspect of the present invention there is provided an apparatus for storing data, said apparatus comprising:

media file generation means for generating at least one media file for storing data as one or more data samples; and index file generation means for generating at least one index file for storing information indicating the configuration of said one or more data samples of said media file, said media file further comprising additional information interspersed throughout said media file, wherein said additional information describes at least one property of said data samples and allows for reconstruction of said index file upon corruption thereof.

According to still another aspect of the present invention there is provided an apparatus for storing video and associated text data, said apparatus comprising:

media file generation means for generating at least one media file in accordance with a first file format, said media file being configured for storing said video and associated text data as one or more data samples; and index file generation means for generating at least one index file in accordance with a second file format, said index file being configured to store information indicating the configuration of said one or more data samples of said media file; and image information adding means for adding additional information interspersed throughout said media file, said media file comprising said additional information being readable by a media player corresponding at least to said first file format, wherein said additional information describes at least one property of said data samples and allows for reconstruction of said index file upon corruption thereof.

According to still another aspect of the present invention there is provided an apparatus for storing at least text data in one or more files as one or more data samples, said apparatus comprising:

storage means for storing a text string in said file corresponding to at least one of said samples, in accordance with a first predetermined data format; and generation means for generating at least one copy of said text string, said copy of said text string being stored in said file in accordance with a second predetermined data format.

According to still another aspect of the present invention there is provided a computer program product comprising a computer readable medium having recorded thereon a computer program for storing data, said program comprising:

code for generating at least one media file for storing data as one or more data samples; and code for generating at least one index file for storing information indicating the configuration of said one or more data samples of said media file, said media file further comprising additional information interspersed throughout said media file, wherein said additional information describes at least one property of said data samples and allows for reconstruction of said index file upon corruption thereof.

According to still another aspect of the present invention there is provided a computer program product comprising a computer readable medium having recorded thereon a computer program for storing video and associated text data, said program comprising:

code for generating at least one media file in accordance with a first file format, said media file being configured for storing said video and associated text data as one or more data samples; and code for generating at least one index file in accordance with a second file format, said index file being configured to store information indicating the configuration of said one or more data samples of said media file; and code for adding additional information interspersed throughout said media file, said media file including said additional information being readable by a media player corresponding at least to said first file format, wherein said additional information describes at least one property of said data samples and allows for reconstruction of said index file upon corruption thereof.

According to still another aspect of the present invention there is provided a computer program product comprising a computer readable medium having recorded thereon a computer program for storing at least text data in one or more files as one or more data samples, said program comprising:

code for storing a text string in said file corresponding to at least one of said samples, in accordance with a first predetermined data format;

code for generating at least one copy of said text string; and code for storing said copy of said text string in said file in accordance with a second predetermined data format.

Other aspects of the invention are also disclosed.

BRIEF DESCRIPTION OF THE DRAWINGS

One or more embodiments of the present invention will now be described with reference to the drawings and appendices, in which:

FIG. 4(a) shows a corrupt AVI™ file;

FIG. 4(b) shows a valid AVI™ file;

DETAILED DESCRIPTION INCLUDING BEST MODE

Figure 1:
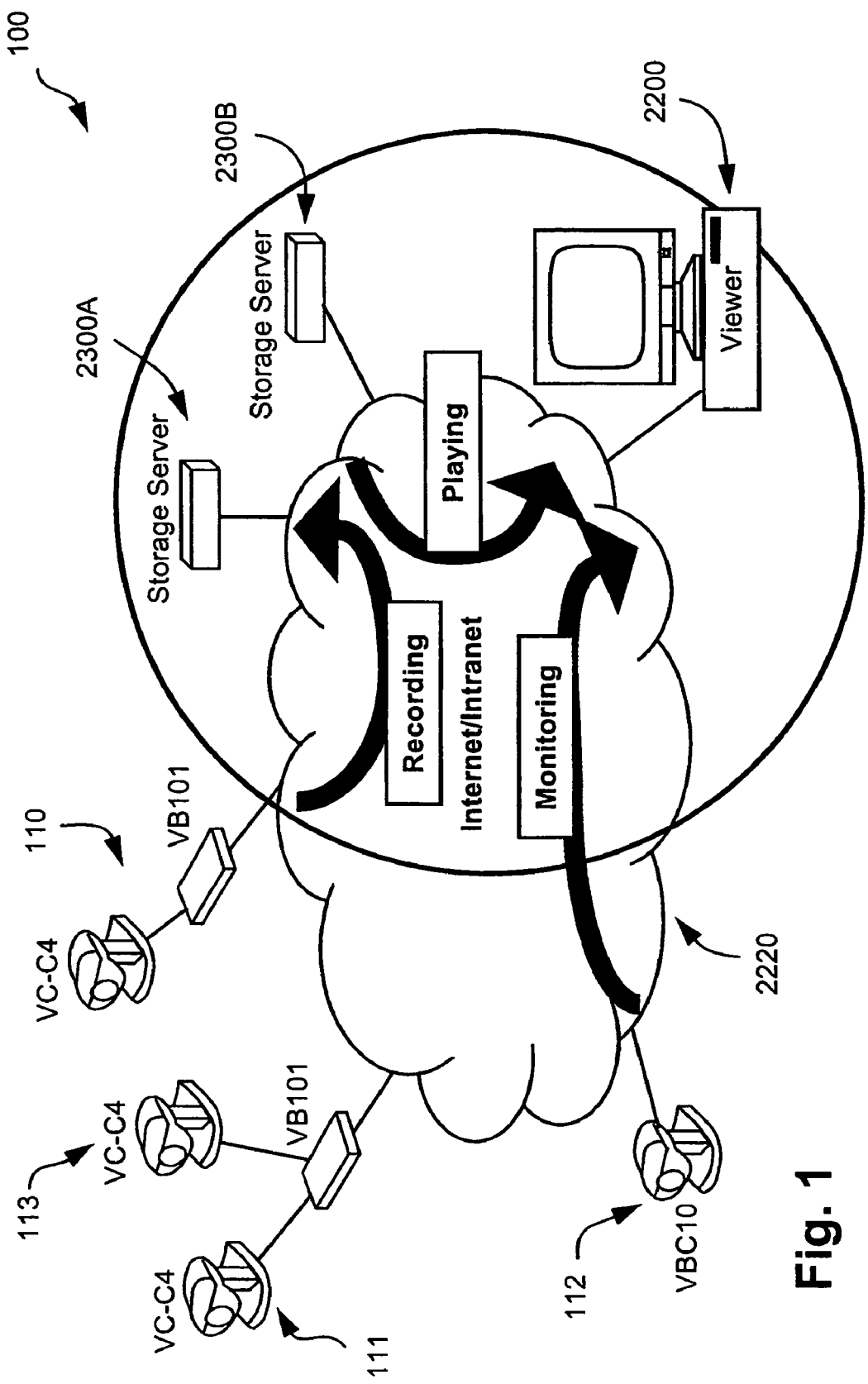
FIG. 1 is schematic diagram of a video surveillance system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the relevant art.

For ease of explanation the following description has been divided into Sections 1.0 to 5.0, each section including associated sub-sections.

1.0 Video Surveillance System Overview

A process 500 (see FIG. 5) for storing video and text data samples, is described below with reference to FIGS. 1 to 23. In one arrangement, the process 500 can be implemented within a video surveillance system 100, such as that shown in FIG. 1. The system 100 comprises video cameras 110, 111, 112 and 113 connected to a communications network 2220, such as the Internet or an Intranet. Each of the cameras 110, 111, 112 and 113 is independently responsible for the capture of video data.

Figure 22:
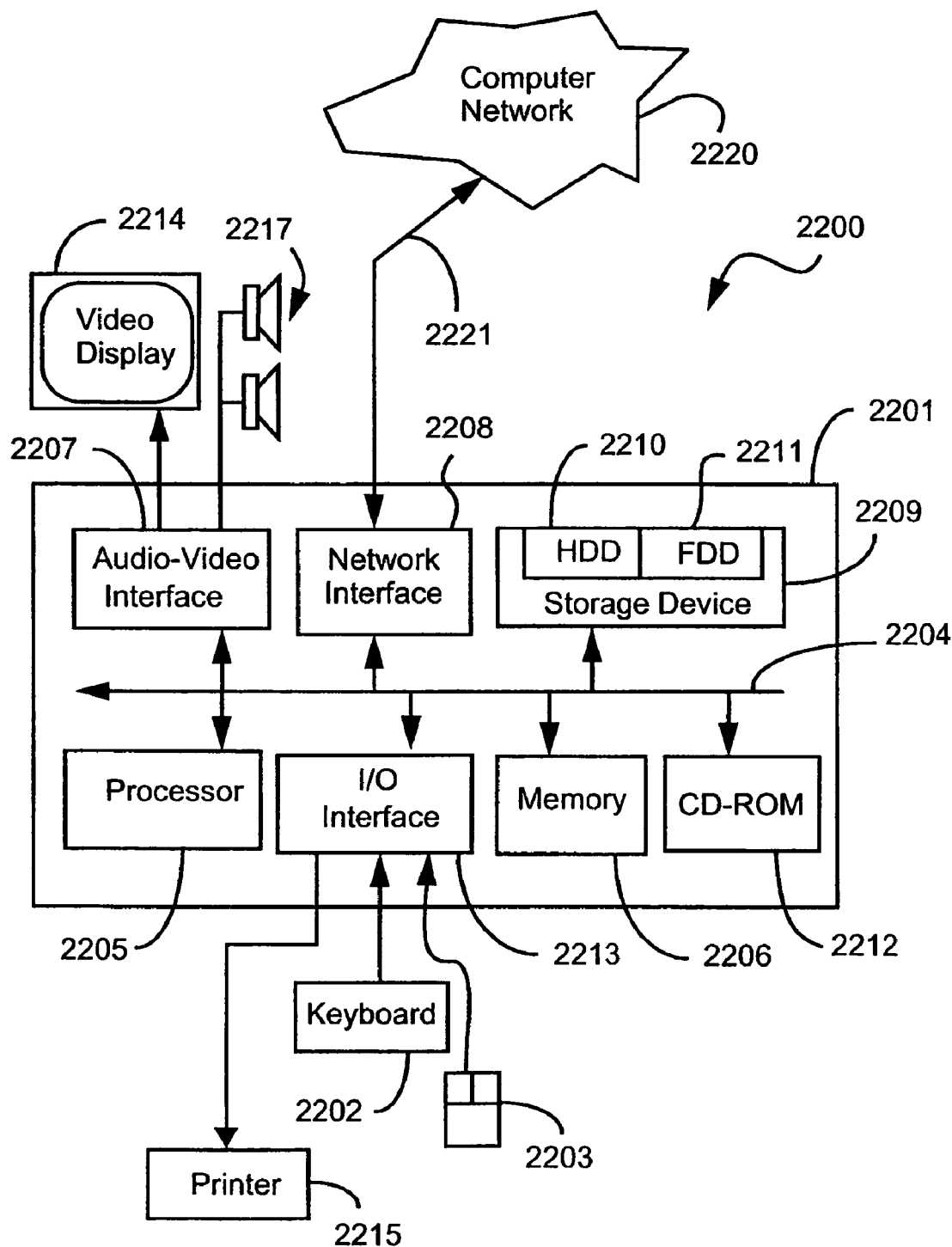
FIG. 22 is a schematic block diagram of a general-purpose computer upon which a viewer described herein can be practiced.
Figure 23:
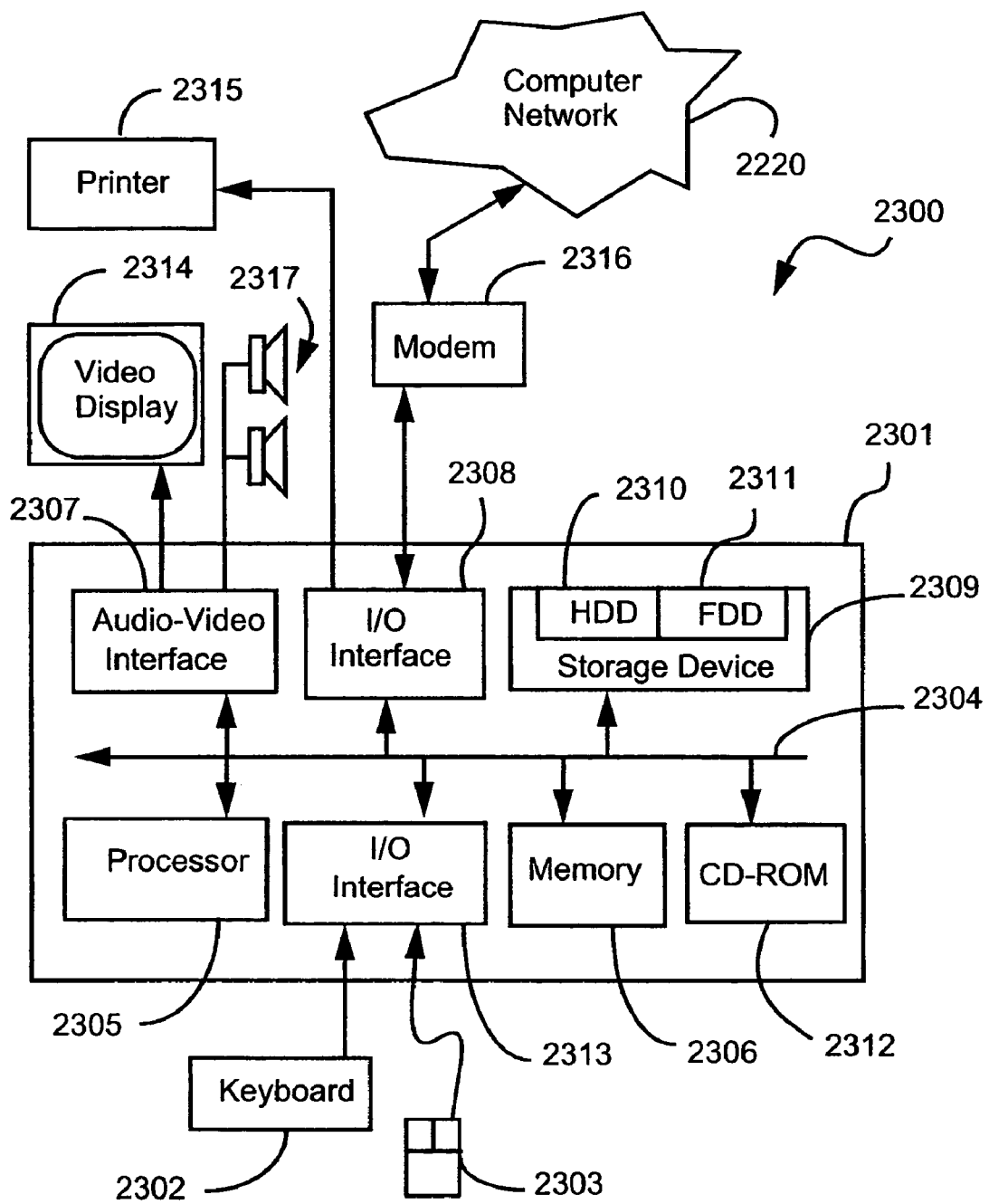
FIG. 23 is a schematic block diagram of a general-purpose computer upon which a storage server described herein can be practiced.

The system 100 also comprises a viewer 2200 for processing and displaying captured video data. As seen in FIG. 22, the viewer 2200 is preferably formed by a computer module 2201, input devices such as a keyboard 2202 and mouse 2203, output devices including a printer 2215, a display device 2214 and loudspeakers 2217. A Modulator-Demodulator (Modem) transceiver device 2216 is used by the computer module 2201 for communicating to and from the communications network 2220, for example connectable via a telephone line 2221 or other functional medium. The modem 2216 can be used to obtain access to the communications network 2220 implemented in the form of the Internet or any other network system, such as a Local Area Network (LAN) or a Wide Area Network (WAN). The modem 2216 may be incorporated into the computer module 2201 in some implementations.

The computer module 2201 typically includes at least one processor unit 2205, and a memory unit 2206, for example formed from semiconductor random access memory (RAM) and read only memory (ROM). The module 2201 also includes a number of input/output (I/O) interfaces including an audio-video interface 2207 that couples to the video display 2214 and loudspeakers 2217, an I/O interface 2213 for the keyboard 2202 and mouse 2203 and optionally a joystick (not illustrated), and an interface 2208 for the modem 2216 and printer 2215. In some implementations, the modem 2216 may be incorporated within the computer module 2201, for example within the interface 2208. A storage device 2209 is provided and typically includes a hard disk drive 2210 and a floppy disk drive 2211. A magnetic tape drive (not illustrated) may also be used. A CD-ROM drive 2212 is typically provided as a non-volatile source of data. The components 2205 to 2213 of the computer module 2201, typically communicate via an interconnected bus 2204 and in a manner, which results in a conventional mode of operation of a computer system as known to those in the relevant art. Examples of computers on which the described arrangements can be practised include IBM-PC's and compatibles, Sun Sparcstations or alike computer systems evolved therefrom.

The video surveillance system 100 also comprises storage servers 2300A and 2300B connected to the communications network 2220. The storage servers 2300A and 2300B are used for recording (i.e., requesting and storing) video data, for accessing video data, for event handling and for the control of the system 100. The storage servers 2300A and 2300B will hereinafter be generically referred to as the storage server 2300, excepting where explicitly distinguished. The storage server 2300 is shown in detail in FIG. 23.

The storage server 2300 is preferably formed by a computer module 2301, input devices such as a keyboard 2302 and mouse 2303, output devices including a printer 2315, a display device 2314 and loudspeakers 2317. A Modulator-Demodulator (Modem) transceiver device 2316 is used by the computer module 2301 for communicating to and from the communications network 2220, for example connectable via a telephone line 2321 or other functional medium. The modem 2316 can be used to obtain access to the Internet, and other network systems, such as a Local Area Network (LAN) or a Wide Area Network (WAN), and may be incorporated into the computer module 2301 in some implementations.

Similar to the computer module 2201, the computer module 2301 typically includes at least one processor unit 2305, and a memory unit 2306, for example formed from semiconductor random access memory (RAM) and read only memory (ROM). The module 2301 also includes an number of input/output (I/O) interfaces including an audio-video interface 2307 that couples to the video display 2314 and loudspeakers 2317, an I/O interface 2313 for the keyboard 2302 and mouse 2303 and optionally a joystick (not illustrated), and an interface 2308 for the modem 2316 and printer 2315. In some implementations, the modem 2316 may be incorporated within the computer module 2301, for example within the interface 2308. A storage device 2309 is provided and typically includes a hard disk drive 2310 and a floppy disk drive 2311. A magnetic tape drive (not illustrated) may also be used. A CD-ROM drive 2312 is typically provided as a non-volatile source of data. The components 2305 to 2313 of the computer module 2301, typically communicate via an interconnected bus 2304 and in a manner, which results in a conventional mode of operation of such a computer system as known to those in the relevant art.

The process 500 is preferably implemented as software, such as an application program executing within the computer module 2301 of the storage server 2300. In particular, the steps of process 500 are effected by instructions in the software that is executed by the processor 2305. The instructions may be formed as one or more code modules, each for performing one or more particular tasks. The software may be stored in a computer readable medium, including the storage devices described below, for example. The software is loaded into the computer module 2301 from the computer readable medium, and then executed by the processor 2305. A computer readable medium having such software or computer program recorded on it is a computer program product. The use of the computer program product in the computer preferably effects an advantageous apparatus for implementing the methods described herein.

2.0 Storage Server Functions

The functionality of the storage server 2300 can be broken up into several categories, which are listed below.

2.1 Recording

The storage server 2300 performs a recording function. The recording function comprises requesting and storing video data captured by the cameras 110 to 113, and receiving event data from the cameras 110 to 113 and various external sources (e.g. heat sensors, door limit switches, smoke detectors, etc). As will be described in detail below, the process 500 for storing video and text data samples is one arrangement of such a recording function.

2.2 Video Access

The storage server 2300 can also perform a video access function. The video access function comprises management of video data captured by the cameras 110 to 113. Such a video access function can also comprise finding a correct video file for a given playback request and serving the video data of the file as a data stream to the viewer 2200.

2.3 Event Handling

The storage server 2300 can also perform an event handling function. Such an event handling function can comprise management of events associated with video data captured by the cameras 110 to 113. The event handling function can also comprise management of events associated with other sensors, such as motion detectors and the like. Such events include motion being detected, heat/smoke being detected, a door opening/closing, and operator annotations entered via the keyboard 2302, for example.

The event handling function can also comprise an indexing component, which is used to analyse the content of video data captured by the cameras 110 to 113. Further, the event handling function can comprise a searching component, used to find a particular segment of recorded video data.

2.4 Control

The storage server 2300 can also perform a control function for configuring the system 100, providing status reports and starting and stopping the recording of video data. Such a control function can also comprise a scheduling component. The scheduling component can enable the automatic recording of video data and the filtering of captured video data according to specific parameters and/or according to a predetermined schedule.

2.5 Viewing

The storage server 2300 can also perform a viewing function. Such a viewing function provides remote viewing across the network 2200, using the display 2314, for example. As such the viewing function can provide an operator interface into recorded video data, extracts, events and control.

3.0 Storage Server File Structure

The storage server 2300 monitors the output of video data from any one of the video cameras 110 to 113. The video data is uploaded, via the communications network 2220, from any one of the video cameras 110 to 113 to the storage server 2300. The video data can be stored on the hard disk drive 2310 so that the video data can be viewed at a later stage using the display 2314. Alternatively, the video data can be uploaded from the hard disk drive 2310 of the storage server 2300 to the viewer 2200 and viewed using the display device 2214 of the viewer 2200.

Additionally, other events can be detected by the storage server 2300. These other events can include motion detection using a motion detector (not shown) connected to the network 2220, heat/smoke detection using a heat/smoke detector, a door opening/closing using a limit switch, for example. Representations of such other events can be stored together with any video data received from any one of the cameras 110 to 113 with which the given event is associated.

Each of the cameras 110 to 113 can output a video data stream. The video data stream represents visual information recorded by a particular camera 110 to 113. The visual information is configured as a sequence of individual frames.

A text data stream is output by the storage server 2300. The text data stream includes the exact time associated with each video frame received by the storage server 2300 from any one of the cameras 110 to 113, as well as descriptions of any events that are associated with a particular camera 110 to 113.

Each distinct portion of data (i.e., a video frame, or a single text string) of a data stream is referred to as a sample.

Figure 2:
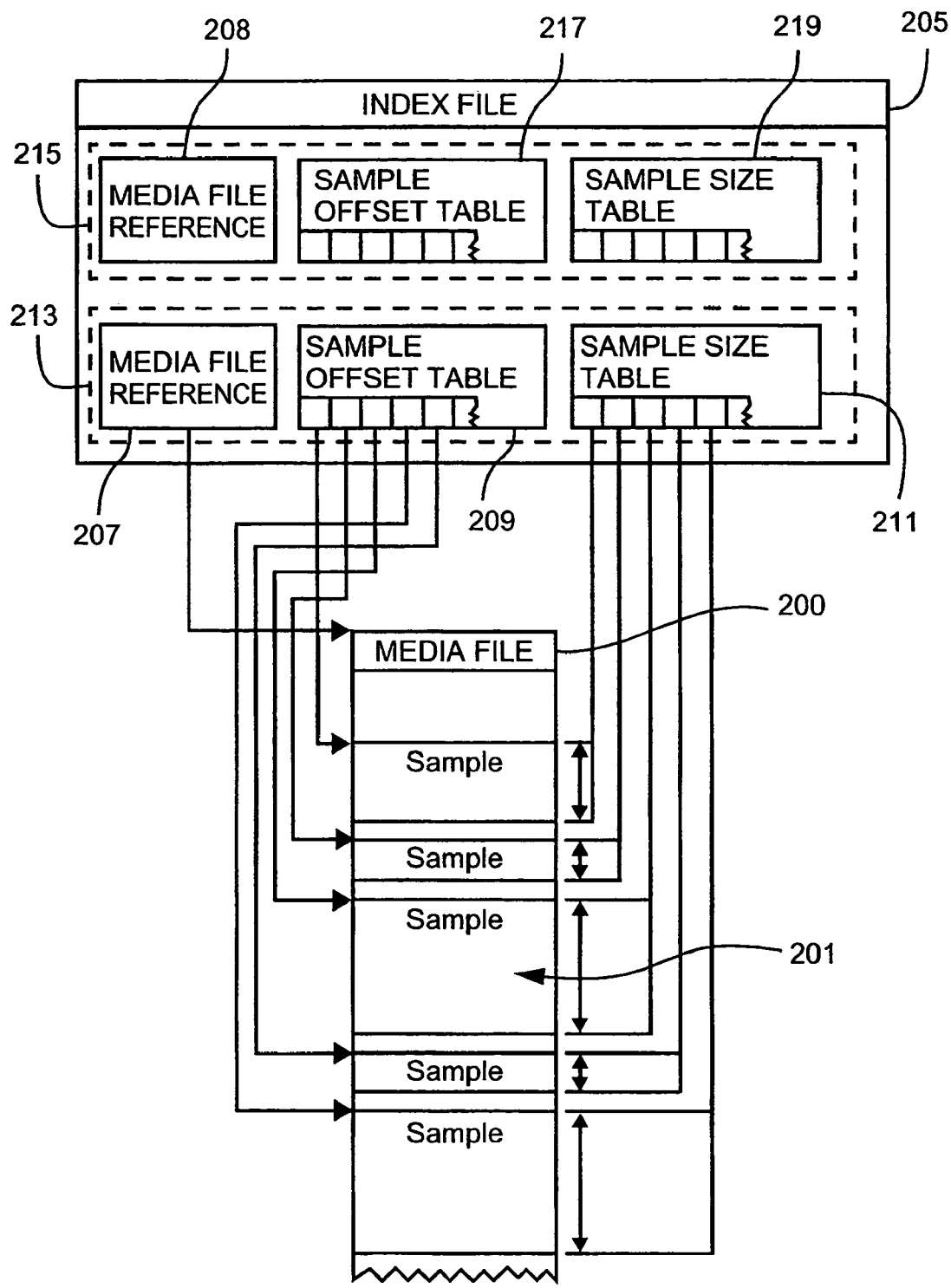
FIG. 2 shows the relationship between an index file and a media file.

The storage server 2300 utilises two types of files to store data on the hard disk drive 2310. As seen in FIG. 2, a first file 200, referred to as a media file, is used to store the video data samples captured by the cameras 110 to 113. The media file 200 stores the samples (e.g. the sample 201) output by the cameras 110 to 113, representing video frames. The media file 200 also stores text samples representing time stamps and event notifications.

A second file 205, referred to as an index file, stores information which instructs a media player application (e.g., QuickTime™) as to where to find each sample in the media file 200, and when each of the samples are to be played by the media player.

The relationship between the media file 200 and the index file 205 is flexible. As described below, the index file 205 contains one or more tracks 213 and 215. Each track contains a reference (e.g. the reference 207) to an associated media file 200. As such, an index file 205 having more than one track 213 can point to several media files (e.g. the media file 200). For example, in the instance where one media file (e.g. the media file 200) contains all video frames while another media file (not shown) contains all event descriptions associated with those video frames, an associated index file (e.g. the file 205) can point to both of the media files.

Further one media file (e.g. the file 200) can be referenced by several index files. For example, in the instance where one media file stores samples (i.e., video data) received from several of the cameras 110 to 113, such a media file 200 can be referenced by several index files 205.

3.1 Index File

The index file 205 is configured in accordance with the QuickTime™ file format. The QuickTime™ file format stores data using a special memory structure called an atom. An atom is a data container specified by the QuickTime™ file format. Each atom has an associated type code which specifies the kind of data stored in the associated atom. As described above, a detailed description of the QuickTime™ file format and in particular, QuickTime™ atoms can be found in the publication entitled "QuickTime File Format", published by Apple Computer Inc.

The index file 205 contains all of the atoms that are specified for a QuickTime™ file. An atom, referred to as a track atom, stores each track (e.g. the tracks 213 and 215). A track associated with a particular track atom contains a pointer (e.g., the media file reference 207) to a media file 200 that is referenced by the track.

As seen in FIG. 2, each of the tracks 213 and 215 of the index file 205 also contains a sample-offset table 209 and 217, respectively. The tracks 213 and 215 store offsets to each sample (e.g. the sample 201) within the associated media file 200. Each of the tracks 213 and 215 of the index file 205 also contains a sample size table 211 and 219, respectively. The sample size tables 211 and 219 store the size of the samples contained in the associated media file 200.

The sample offset tables 209 and 217 and the sample size tables 211 and 219, are configured to be read by a QuickTime™ media player. As a result, a completed index file 205 can be opened by a QuickTime™ media player, which locates the associated media file 200 using the media file reference (e.g. the reference 207) included within a track 213 of the index file 205. Additionally, as long as the contents of the completed index file 205 are flushed to the hard disk drive 2310 regularly and in a manner that ensures the consistency of the file 205, the QuickTime™ media player may view an in-progress recording up to the point of the last full flush. If there is a system failure, data added to the index file 205 after the last time that the file 205 was flushed will be lost from the index file 205.

3.2 Media File

The format of the media file 200 is flexible. Each individual sample (e.g. 201) is stored as a single set of consecutive bytes. The following sections 3.2.1, 3.2.1.1 and 3.2.1.2 describe a preferred format for the media file 200, which is supported by the described arrangements. However, a person skilled in the relevant art would appreciate that any suitable file format can be used for the media file 200.

3.2.1 AVI™ Media Data Format

The media file 200 is configured in accordance with the Microsoft™ AVI™ file format. The media file 200 is playable by any media player software application that can read the AVI™ file format.

The AVI™ file format has several limitations with regard to the processing of video data captured with the cameras 110 to 113. Firstly, each AVI™ video data sample is played back at a constant frame rate. Thus, changes in frame rate or late frames due to network lag can result in the playback rate inaccurately portraying the passage of time. Secondly, for an image file configured in accordance with the motion-JPEG (Joint Photographics Experts Group) standard, a value representing image resolution is stored within each JPEG fragment of the image file. However, media players such as the Windows™ Media Player can not scale the image, resulting in sub-optimal playback results.

When the media file 200 is first created, a set of headers is generated. An AVI™ header is generated to store general details about the file 200. Further, individual stream headers are generated to represent each track within the associated index file 205 that points to the given media data file. An empty sample list structure is also created to store each individual sample (e.g. the sample 201) of the media file 200.

When the media file 200 is closed, the headers are updated to reflect the number of samples that were stored within the media file 200. Further, an associated AVI™ index (not shown) is appended to the end of the file 200. The AVI™ index is a standard structure required by the Windows™ Media Player to play back the video data of an AVI™ file 205.

When inserting a sample (e.g. the sample 201) into an open media file 200, the sample is stored within a new sample chunk of the file 200. The stored sample has a header indicating which data stream the corresponding sample belongs to and the size of the sample. Additionally, a special chunk, hereinafter referred to as a 'CNVD' chunk is inserted in front of the newly stored sample. The CNVD chunk is configured to be ignored by a standard AVI™ media player. The CNVD chunk contains additional information, which can be used to recover the media file 200 and the associated index file 205. In particular, the CNVD chunk contains information including the timestamp (i.e., in milliseconds) and the resolution of the newly stored sample following the CNVD chunk.

3.2.1.1 AVI™ Video Stream Handling

Each video frame of the video data captured by the cameras 110 to 113 is preferably configured as a separate JPEG file, which is inserted as a separate sample (i.e., sample chunk) within the AVI™ media file 200.

3.2.1.2 AVI™ Text Stream Handling

The QuickTime™ file format specifies that a text string must consist of a 16-bit length field, followed by the text string characters. However, the AVI™ file format specifies a null-terminated string. In order to allow text strings to be played back correctly in both the QuickTime™ and the AVI™ file formats, two copies of the same text string are placed within a relevant sample chunk of the media file 200. The first copy of the text string is a null-terminated version of the text string. An AVI™ media player automatically locates the first copy at the beginning of the relevant sample of the file 200, and discards any data subsequent to the terminating character. The second copy of the text string is placed immediately after the null character terminating the first copy. The second copy is configured in accordance with the QuickTime™ file format. In this case, the QuickTime™ index file 205 is provided with the offset of the second copy of the string, rather than the offset of the beginning of a sample, which the index file 205 normally uses to reference a corresponding sample.

Figure 3:
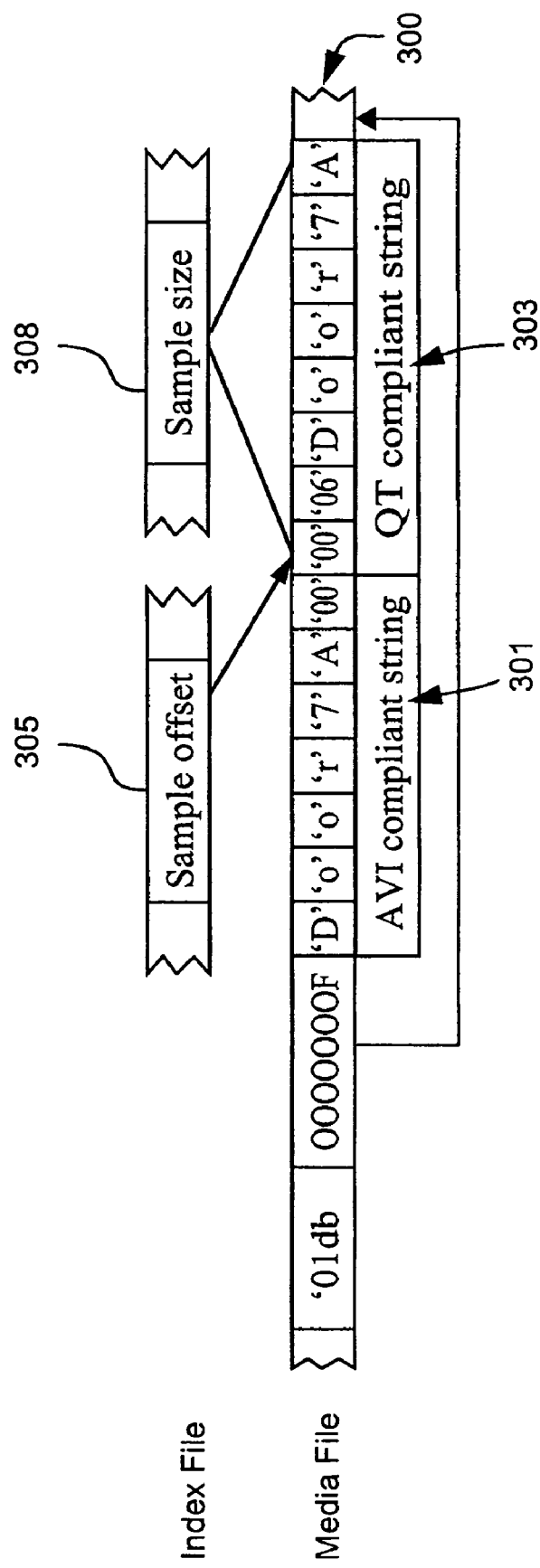
FIG. 3 shows an example of the placement of a text sample within a media file configured in accordance with the AVI™ file format.

As an example, FIG. 3 shows the placement of the text string sample, "Door7A", within a media file 300 configured in accordance with the AVI™ file format. As seen in FIG. 3, an AVI™ version 301 and a QuickTime™ version 303 of the text sample are included in the file 300. FIG. 3 also indicates the sample offset 305 and the sample size 308 entries of a corresponding index file (not shown) for the data string "Door7A". In particular, the sample offset entry 305 points to the beginning of the QuickTime™ version 303 of the text sample. Further, the sample size entry 308 provides the size of the QuickTime™ version 303.

4.0 Process Flow Diagrams 4.1 Data Storage Method

Figure 5:
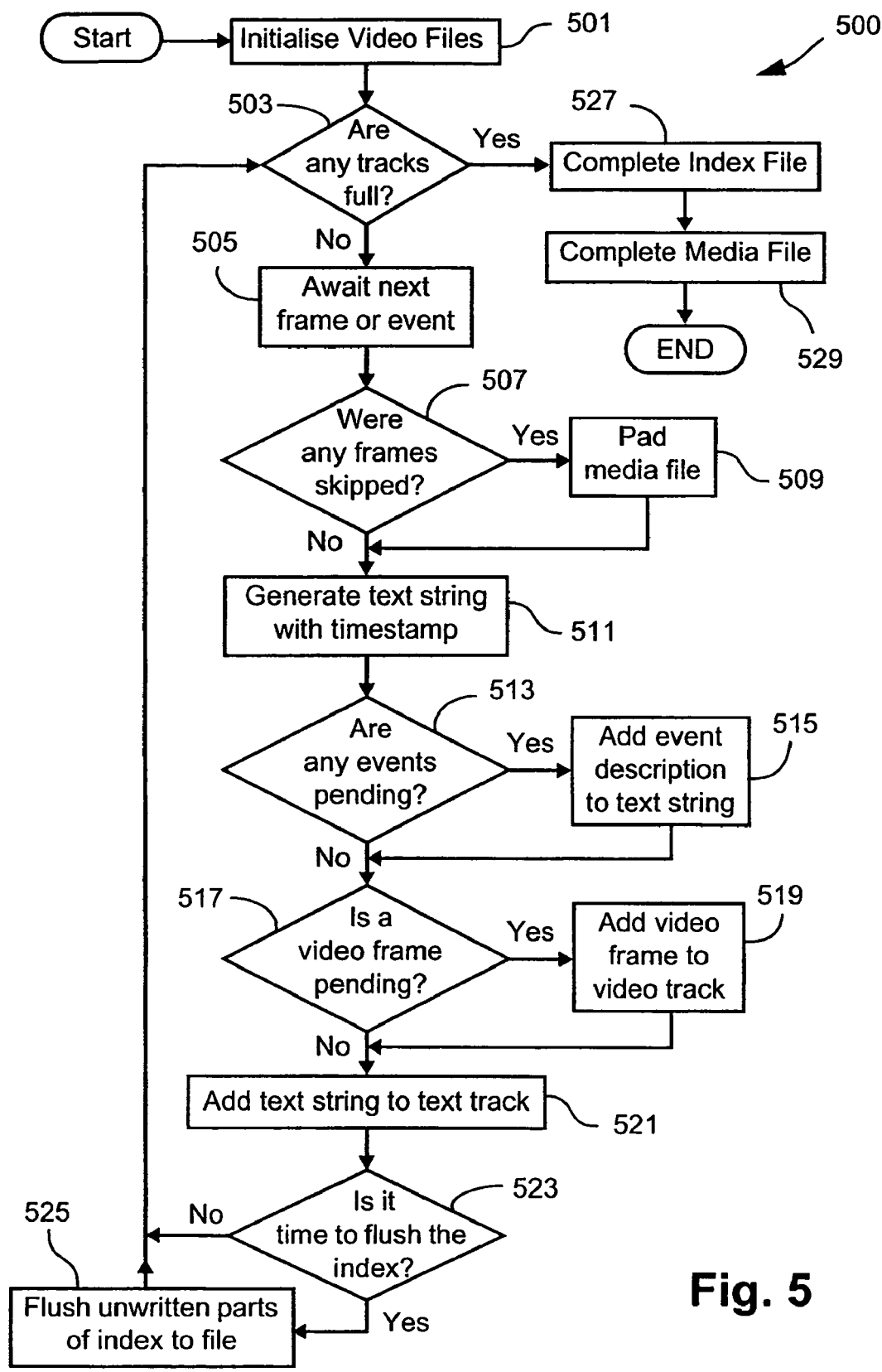
FIG. 5 is a flow diagram showing a process for storing video and text data samples.

The process 500 of storing data will now be described with reference to the flow diagram of FIG. 5. As described above, the process 500 is preferably implemented as software resident on the hard disk drive 2310 and being controlled in its execution by the processor 2305 of the storage server 2300.

The process 500 generates a media file 200 and an associated index file 205 for video data captured by any one of the cameras 110 to 113 over a certain period of time. Data captured from each camera 110 to 113 is added to a separate index and media file. For ease of explanation, the process 500 will be described with reference to video data captured by the camera 110.

The process 500 utilises one or more predetermined parameters including a media file format parameter, a track capacity parameter, a track rate parameter and a data source parameter, which will be described below. These predetermined parameters can be defined within a configuration file, for example, stored on the hard disk drive 2310. The process 500 also utilises one or more other parameters including a media file parameter and an index file parameter, which again will be described below. The media file parameter and the index file parameter are preferably dynamically generated by the processor 2305, as the process 500 executes. The media file parameter and the index file parameter can be generated using any suitable method that ensures the uniqueness of the parameters.

The process 500 begins at step 501 where the processor 2305 initialises a media file 200 and an associated index file 205, in the hard disk drive 2310, to be used for video data captured by the camera 110. As described above, the index file 205 includes at least one associated track (e.g. the tracks 213 and 215). The tracks 213 and 215 include a reference 207 and/or 208 to the associated media file 200, respectively. The tracks 213 and 215 also include a sample-offset table 209 and 217, respectively, for storing offsets to each sample to be added to the media file 200. The tracks 213 and 215 also comprise a sample size table 211 and 219, respectively, for storing the size of each sample added to the media file 200. The process of step 501 will be described in detail below with reference to the flow diagram of FIG. 6.

At the next step 503, if any of the tracks 213 and 215 indicate that the capacity of the tracks 213 and 215 have been reached or exceeded, then the method 500 proceeds to step 527. Otherwise, the method 500 proceeds to step 505. The capacity of the tracks 213 and 215 is indicated by a capacity value stored together with the index file 205. As will be described below, a track structure is created in the index file 205 for each of the tracks of the index file 205. The track structure for each track is dependent on the type of track (i.e., video track or text track). The capacity value refers to the number of samples that can be indexed within a track structure of the index file 205.

At step 505, the processor 2305 waits to detect a next sample (i.e., data stream) output from the camera 110, representing a video frame or event. In the described arrangements, each frame of video data or text string generated by the camera 110 constitutes a single sample.

At the next step 507, if the processor 2305 determines that one or more samples representing one or more frames or text strings, output from the camera 110, have been missed, then the method 500 proceeds to step 509. Otherwise, the method 500 proceeds to step 511. At step 509, the processor 2305 advances a time variable referred to as the "padding time" variable by a predetermined sample duration. This sample duration is determined using a predefined frame rate specified by the processor 2305 when creating the tracks 213 and 215 of the index file 205. The processor 2305 then inserts empty samples, which can be referred to as padding frames, into the media file 200, at step 509, if necessary, in order to compensate for the missed samples. The process of step 509 will be described in detail below with reference to the flow diagram of FIG. 16.

At step 511, the processor 2305 generates a text string to describe the time at which the current sample (i.e., frame or text string) is being inserted into the media file 205. Then at the next step 513, if the processor 2305 determines that there are any pending events, the method 500 proceeds to step 515. Otherwise, the method 500 proceeds directly to step 517. At step 515, text descriptions of the pending events are appended to the text string generated at step 511.

The method 500 continues at the next step 517, where if the processor 2305 determines that the sample detected at step 505 (i.e., the current sample) is a video frame, then the method 500 proceeds to step 519. Otherwise, the method 500 proceeds directly to step 521. At step 519, the processor 2305 adds the current sample to the media file 200. The process of step 519 will be described in detail below with reference to the flow diagram of FIG. 11.

At step 521, the processor 2305 adds the current sample, in this case a text string, to the media file 200. The current sample is referenced by the track 213. The process of step 521 will be described in more detail below with reference to flow diagram of FIG. 12.

The method 500 continues at the next step 523, where the processor 2305 determines if any unwritten index file data in memory 2306 should be flushed to the hard disk drive 2310, according to a predetermined flushing interval. Any suitable flushing interval that ensures the consistency of the index file 205 can be used. If the processor 2305 determines that data should be flushed, then the method 500 proceeds to step 525. Otherwise, the method 500 returns to step 503. At step 525, the processor writes any unwritten index file data from memory 2306 to the hard disk drive 2310.

As described above, if any of the tracks 213 and 215 indicate that the capacity of the tracks 213 and 215 have been reached or exceeded, then the method 500 proceeds to step 527. At step 527, the processor 2305 completes the index file 205 configured within the hard disk drive 2310, and closes the index file 205. The process of step 527 will be described in detail below with reference to the flow diagram of FIG. 17.

The method 500 concludes at the next step 529, where the media file 200 configured within the hard disk drive 2310, is completed and closed. The process of step 529 will be described in detail below with reference to the flow diagram of FIG. 18.

4.2 Initialise Video Files Process

Figure 6:
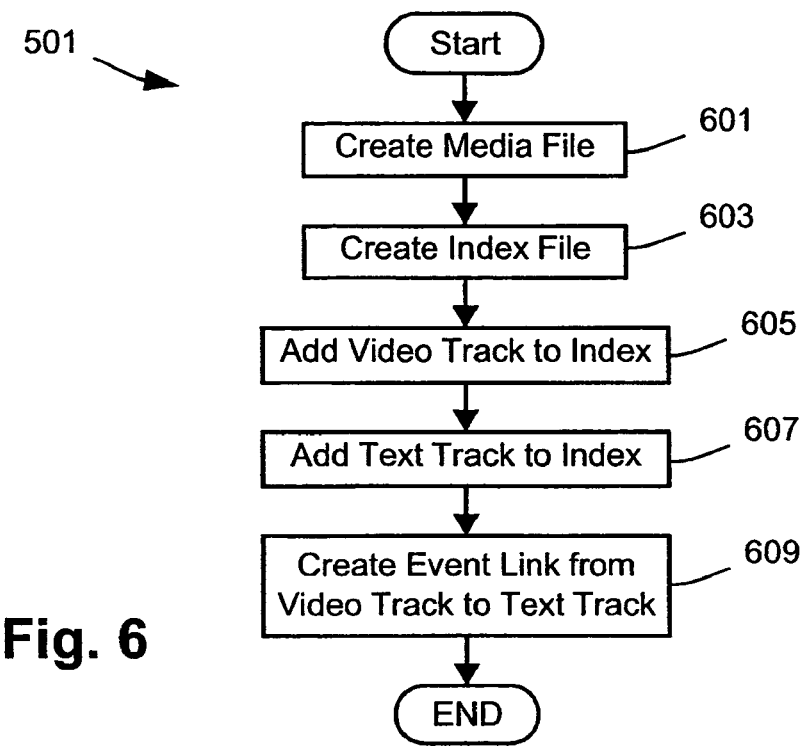
FIG. 6 is a flow diagram showing a process for initialising video files.

The process of step 501 will now be described with reference to the flow diagram of FIG. 6. The process of step 501 is preferably implemented as software resident in the hard disk drive 2310 and being controlled in its execution by the processor 2305. The process of step 501 begins at step 601 where the processor 2305 creates the media file 200 in the hard disk drive 2310. The media file 200 is created according to a media file path parameter and a media file format parameter, which are supplied by the processor 2305. The media file format parameter specifies the file format (e.g. AVI™ or Quick-Time™) for the media file 200. At the next step 603, the processor 2305 creates the index file 205 in the hard disk drive 2310. The index file 205 is generated based on an index file path parameter, which is supplied by the processor 2305. As described above, the index file is generated in accordance with the QuickTime™ format.

The process of step 501 continues at the next step 605 where the processor 2305 creates a first track (e.g. the track 213) based on a track capacity parameter, a track rate parameter and a data source identifier parameter supplied by the processor 2305. The track created at step 605 (e.g. the track 213) is configured to reference video data samples to be stored in the media file 200. Also at step 605, the processor 2305 adds the video track 213 to the index file 205 configured within the hard disk drive 2310. Then at the next step 607, the processor 2305 creates a second track (e.g. the track 215)

based on the track capacity parameter, the track rate parameter and the data source identifier parameter. The second track 215 is configured to reference text strings. Also at step 607, the processor 2305 adds the created text track 215 to the index file 205. The process of steps 605 and 607 will be described in detail below with reference to the flow diagram of FIG. 9.

The process of step 501, concludes at the next step 609 where the track references for the created tracks 213 and 215 are linked in order to indicate that the created text track 215 refers to descriptions of events that are associated with the video data corresponding to the video track 213.

4.3 Create Media File Process

Figure 7:
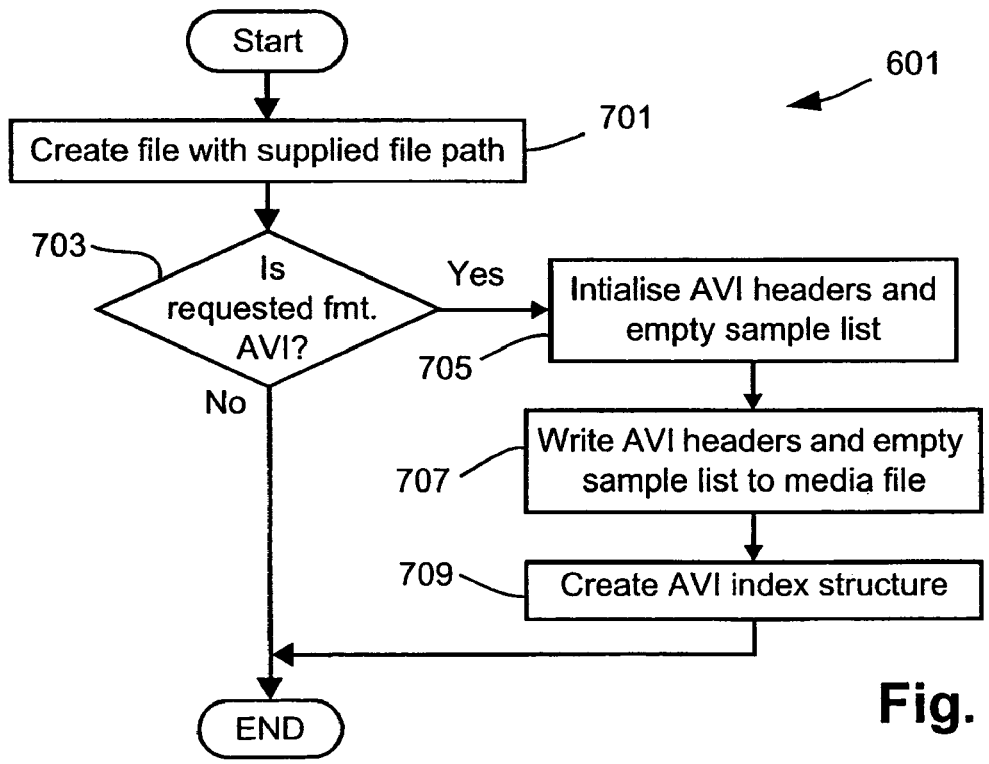
FIG. 7 is a flow diagram showing a process for generating a media file.

The process of step 601 will now be explained with reference to the flow diagram of FIG. 7. The process of step 601 is preferably implemented as software resident in the hard disk drive 2310 and being controlled in its execution by the processor 2305. The process of step 601 begins at step 701 where the processor 2305 creates the media file 200 at a memory address, in the hard disk drive 2310, as specified by the media file path parameter supplied by the processor 2305 at step 601. At the next step 703, if the media file format parameter specifies that the media file 200 is to be configured in accordance with the AVI™ file format, then the process of step 601 proceeds to step 705. Otherwise, the process concludes.

At step 705, the processor 2305 creates an empty set of headers and an empty sample structure to store the samples detected by the processor 2305, as at step 505 of the process 500. Then at step 707, the created sample structures are written to the media file 200 configured within the hard disk drive 2310. The process of step 601 concludes at the next step 709 where the processor 2305 creates an AVI™ index file structure. The index file structure can be stored either in the memory 2306 or in a temporary file configured within the hard disk drive 2310, since the index file structure will be appended to the end of the media file 200, the resultant length of which is currently unknown.

4.4 Create Index File Process

Figure 8:
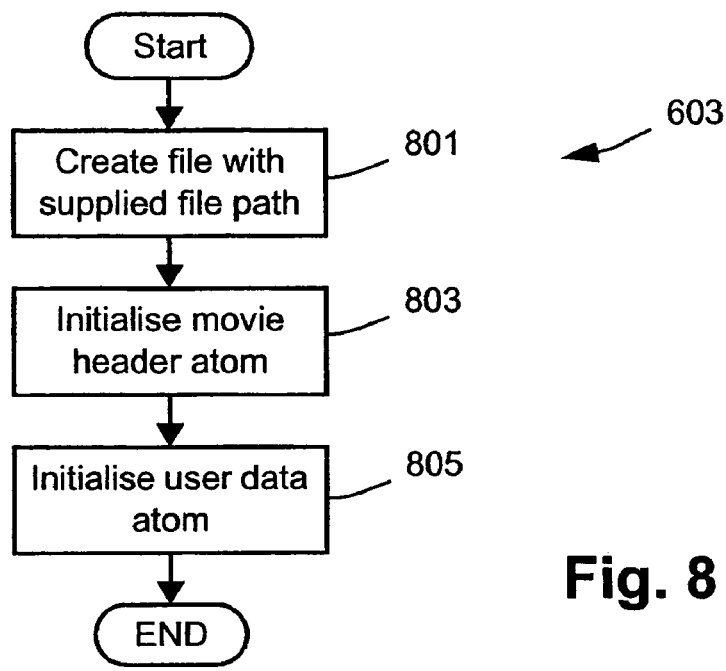
FIG. 8 is a flow diagram showing a process for generating an index file.

The process of step 603 will now be explained with reference to the flow diagram of FIG. 8. The process of step 603 is preferably implemented as software resident in the hard disk drive 2310 and being controlled in its execution by the processor 2305. The process of step 603 begins at step 801 where the processor 2305 creates the index file 205 at a memory address, in the hard disk drive 2310, as specified by the index file path parameter supplied by the processor 2305 at step 603. Then at the next step 803, the processor 2305 initialises a movie header atom for the index file 205. Movie header atoms are used to specify the characteristics of an entire QuickTime™ movie and are explained in detail in the publication entitled "QuickTime File Format", published by Apple Computer Inc., as discussed above. The process of step 603 concludes at the next step 805, where the processor 2305 initialises a user data atom for the index file 205. User data atoms allow a user to define and store data associated with a QuickTime™ object such as a movie.

4.5 Add Track to Index File Process

Figure 9:
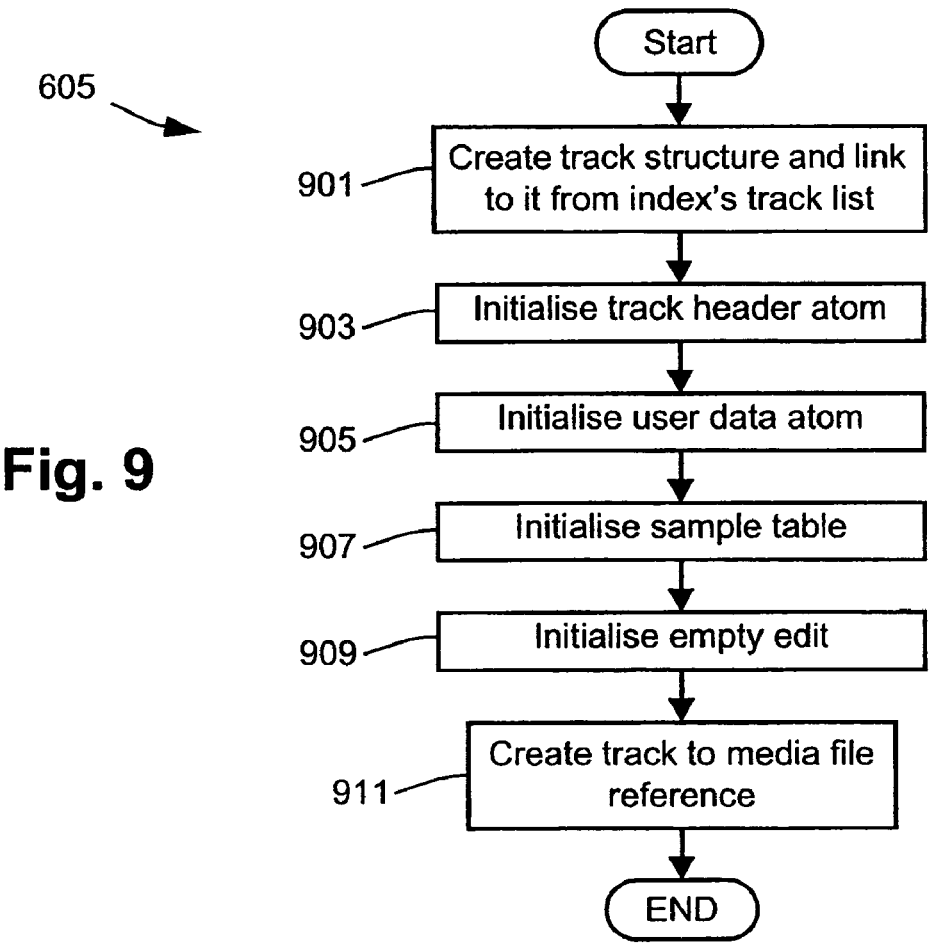
FIG. 9 is a flow diagram showing a process for adding a track to an index file reference.

The process of steps 605 and 607 will now be described with reference to the flow diagram of FIG. 9. The process of step 605 is preferably implemented as software resident in the hard disk drive 2310 and being controlled in its execution by the processor 2305. The process of step 605 begins at the first step 901 where the processor 2305 creates a track structure of a capacity and rate defined by the track capacity parameter and a track rate parameter, for the index file 205 which is referenced by an index file reference supplied by the processor 2305. The track structure is created in accordance with a track type (i.e., video track or text track) parameter, supplied by the processor 2305 depending on which of the tracks 213 and 215 are being created. At the next step 903, the processor 2305 initialises a track header atom for the created track structure. Then at step 905, the processor 2305 initialises a user data atom for the created track structure.

The process of step 605 continues at the next step 907, where the sample tables 209 and 211 are initialised for the created track structure. Then at step 909, the processor 2305 initialises an empty edit list, which can be used to arrange the media file sample structure into a time sequence. The process of step 605 concludes at the next step 911 where a media file reference 207 is written to the track structure created at step 901 in order to reference the associated media file 200. The process of step 911 will be described in more detail below with reference to FIG. 10.

4.6 Create Track to Media File Reference Process

Figure 10:
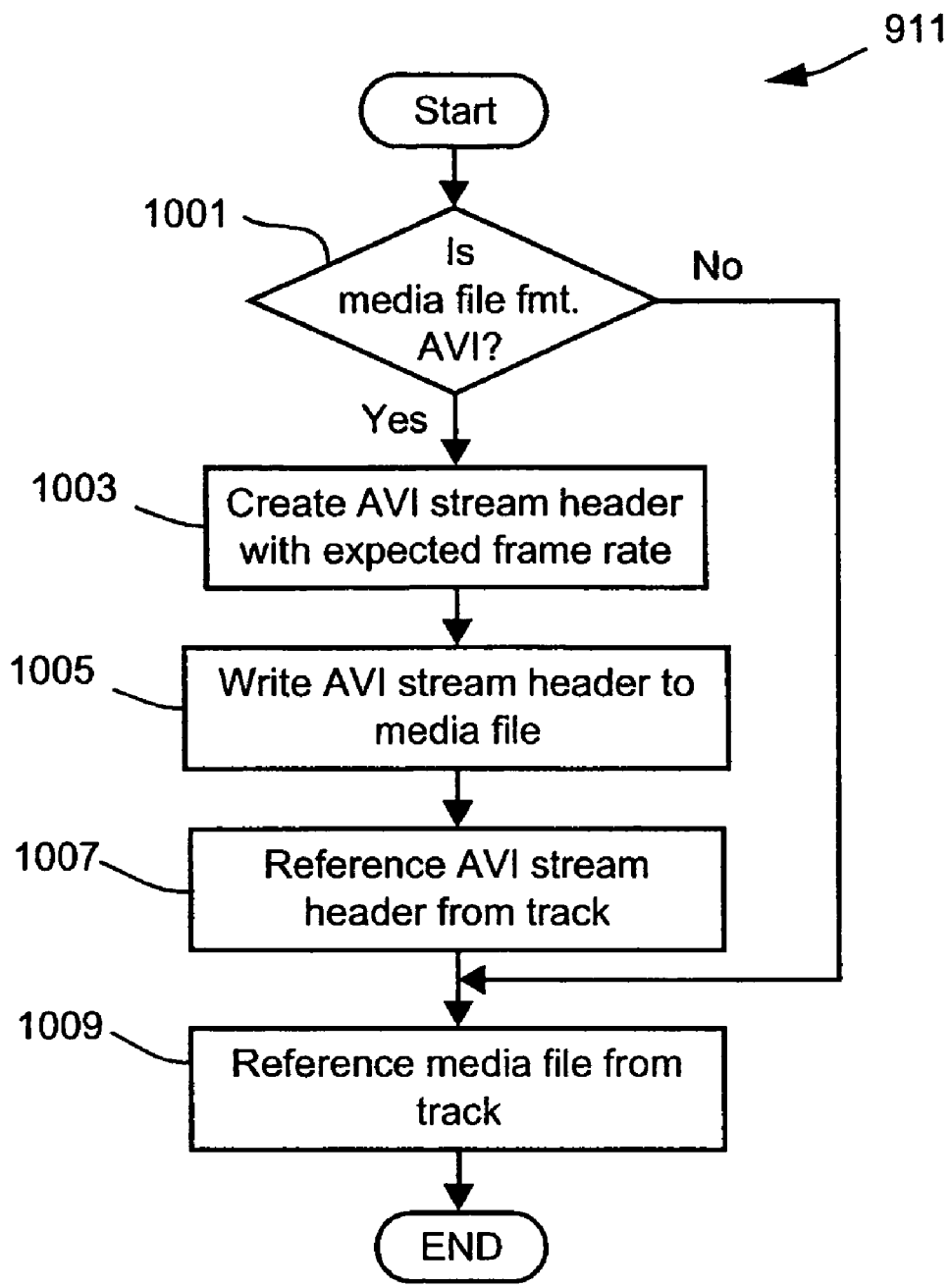
FIG. 10 is a flow diagram showing a process for creating a track to media file reference.

The process of step 911 will now be described with reference to FIG. 10. The process of step 911 is preferably implemented as software resident in the hard disk drive 2310 and being controlled in its execution by the processor 2305. The process of step 911 begins at the first step 1001 where if the processor 2305 determines that the media file 200, referenced by the media file reference, is in AVI™ format then the process proceeds to step 1003. Otherwise, the process of step 911 proceeds the step 1009. At step 1003, the processor 2305 creates an AVI™ sample header structure using a track structure reference supplied by the processor 2305. Then at the next step 1005, the processor 2305 writes the sample header structure to a header area of the media file 200, configured within the hard disk drive 2310. At the next step 1007, the processor 2305 adds a reference for the AVI™ sample header to the tracks (213 or 215) of the index file 205 indicated by the track structure reference parameter. The process of step 911 concludes at the next step 1009 where the processor 2305 adds a reference for the media file 200 to the track 213 or 215, as the media file reference 207.

4.7 Add Sample (i.e., Frame) to Video Track Process

Figure 11:
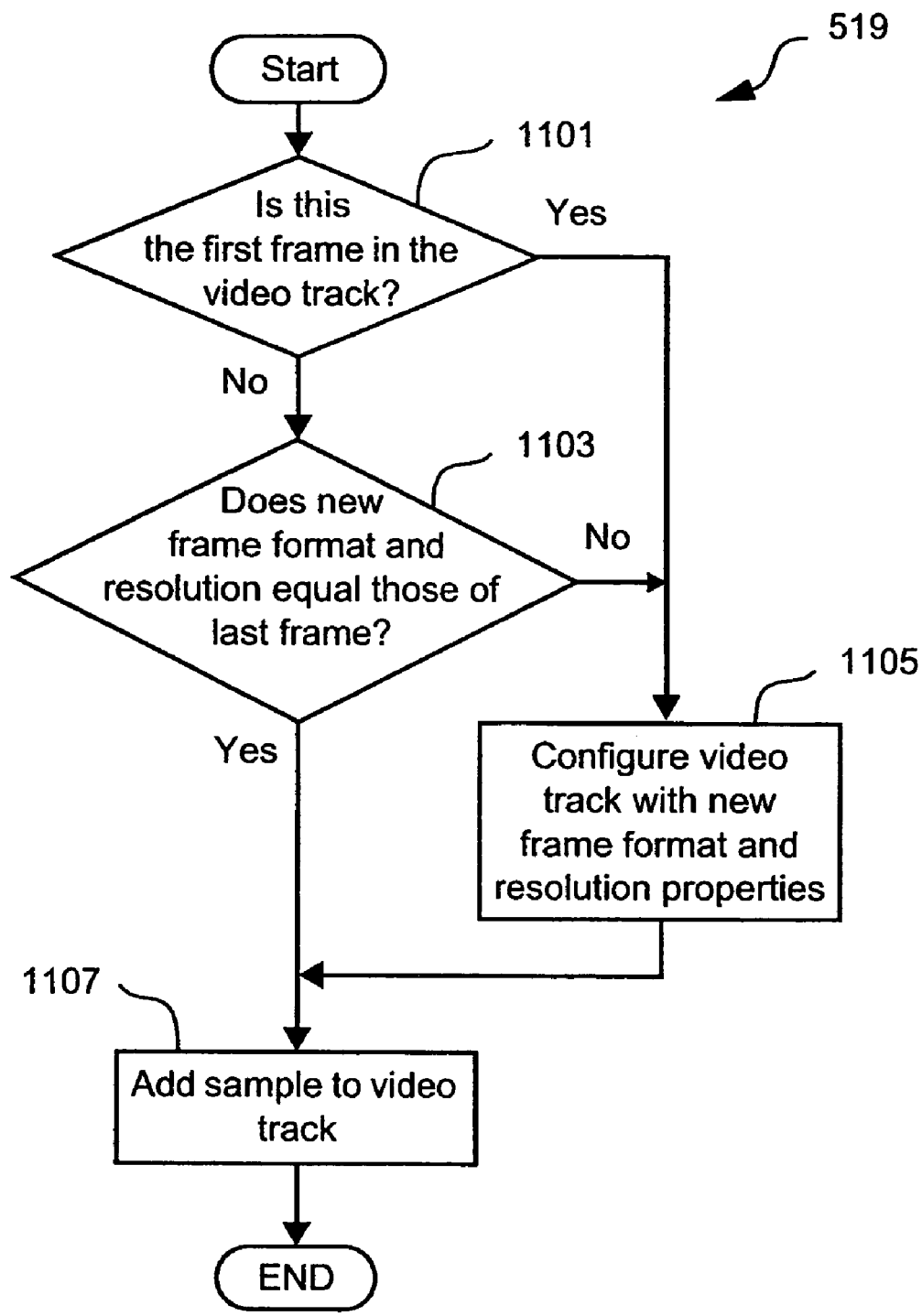
FIG. 11 is a flow diagram showing a process for adding a sample (i.e., a frame) to a video track.

The process of step 519 will now be described with reference to the flow diagram of FIG. 11. The process of step 519 is preferably implemented as software resident in the hard disk drive 2310 and being controlled in its execution by the processor 2305. The process of step 519 begins at the first step 1101 where if the processor 2305 determines that the sample detected at step 505 is the first frame to be associated with the video track 213 of the index file 205, then the process of step 519 proceeds to step 1105. The processor 2305 uses a track structure reference generated by the processor 2305 during the process of step 605 to identify the video track 213.

If the current sample is not the first frame to be associated with the video track 213, at step 1101, then the process proceeds to step 1103 where the processor 2305 determines whether the video track 213 is configured to accept the current sample. In making the determination at step 1103, the processor 2305 reads a frame data parameter, associated with the current frame, to determine whether the frame format and resolution of the current frame is the same as the previous frame. If the outcome of step 1103 is true, then the process of step 519 proceeds to step 1107. Otherwise, the process proceeds to step 1105.

At step 1105, the processor 2305 configures the track 213 according to the frame format and resolution properties of the current frame. The process of step 1105 will be described in more detail below with reference to FIG. 19. The process of step 519 concludes at the next step 1107 where the processor 2305 adds the frame to the sample size table (e.g. the sample size table 211) of the track 213. The required frame details are determined by the processor 2305 using the frame data, frame data size and frame recording time parameters associated with the current frame. The processor also adds the frame to the media file 200 and adds a reference corresponding to the frame to the sample offset table 209 of the track 213. The process of step 1107 will be described in more detail below with reference to the flow diagrams of FIGS. 13 and 14.

4.8 Add String to Text Track Process

Figure 12:
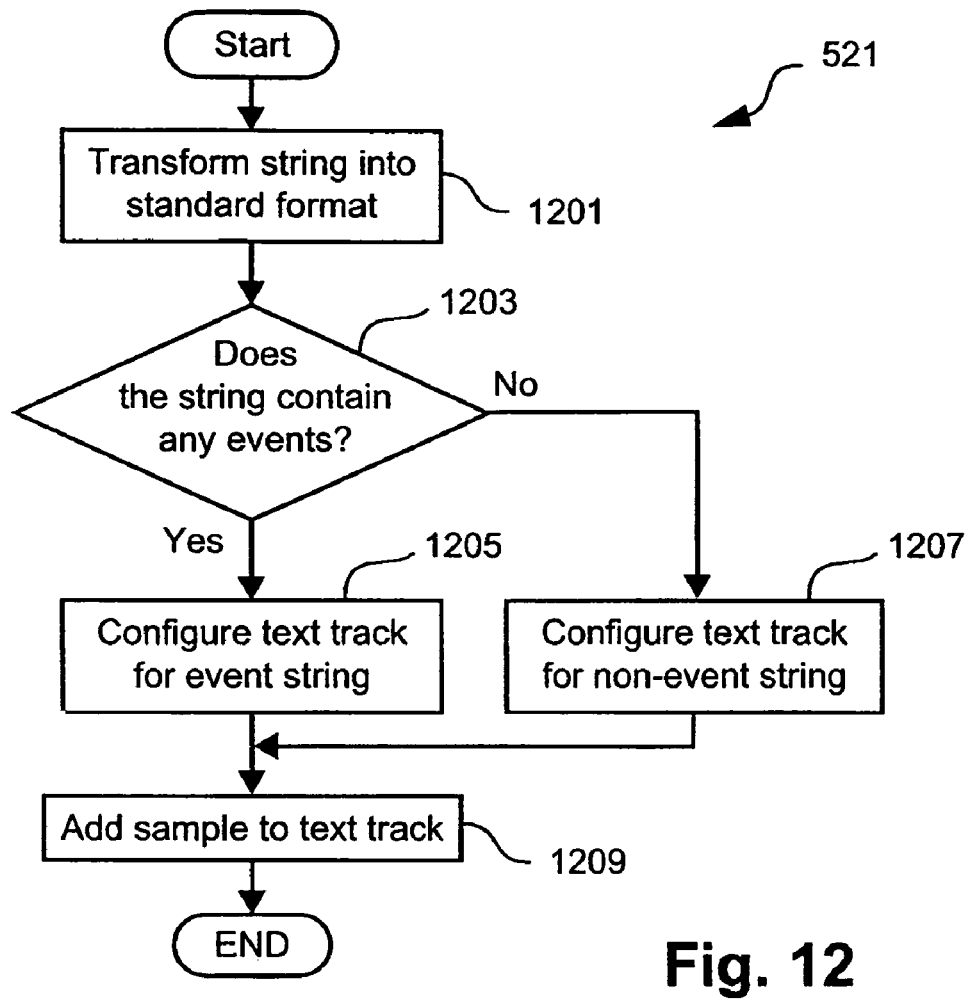
FIG. 12 is a flow diagram showing a process for adding a string to a text track process.
Figure 13:
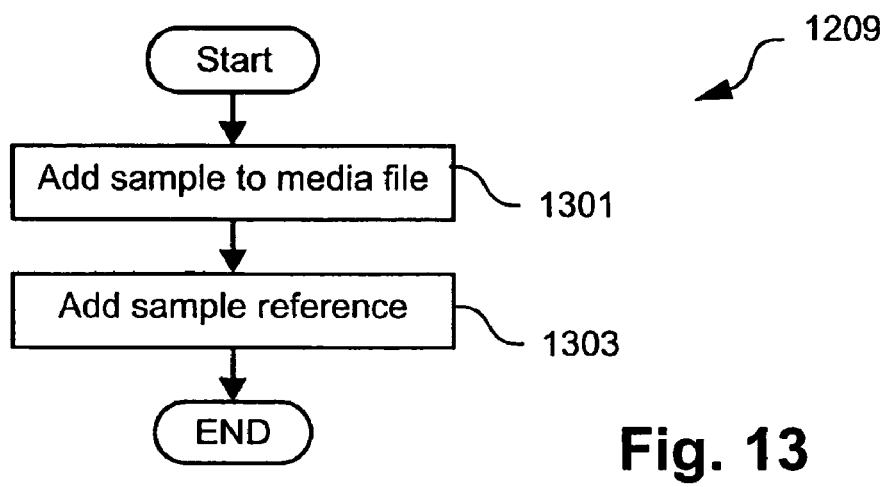
FIG. 13 is a flow diagram showing a process for adding a sample to a track.
Figure 14:
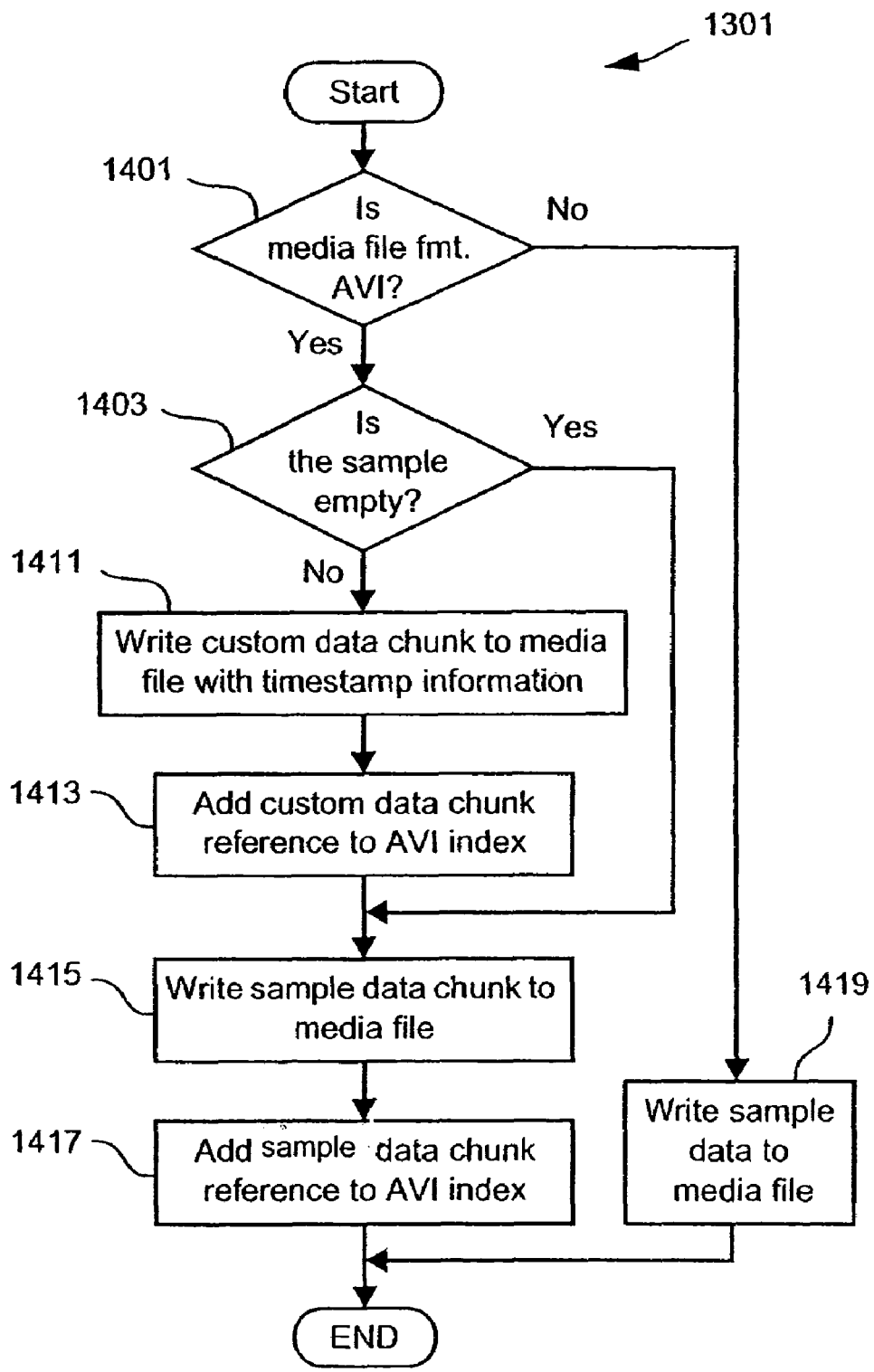
FIG. 14 is a flow diagram showing a process for adding a sample to a media file.

The process of step 521 will now be described with reference to the flow diagram of FIG. 12. The process of step 521 is preferably implemented as software resident in the hard disk drive 2310 and being controlled in its execution by the processor 2305. As described above, if the processor 2305 determines, at step 517, that the sample detected at step 505 is not a video frame (i.e., the sample contains a text string), then the method 500 proceeds to step 521. The process of step 521 begins at the first step 1201 where the processor 2305 transforms the sample into the format described above with reference to FIG. 3. That is, a first null-terminated copy of the text string contained in the sample is created in memory 2306 and a second copy of the text string is configured in accordance with the QuickTime™ format.

At the next step 1203, if the processor 2305 determines that the sample contains any events, then the process proceeds to step 1205. Otherwise, the process proceeds to step 1207. At step 1205, the text track 215 (indicated by the track structure reference parameter for the text track 215) of the index file 205 is configured for an event string. At step 1207, the text track 215 is configured for a non-event string. The process of steps 1205 and 1207 will be described in more detail below with reference to FIG. 19.

The process of step 521 concludes at the next step 1209 where the processor 230, using the text string parameter and text string recording time parameter, adds a reference to the sample detected at step 505 to the text track 215. The process of step 1209 will be described in more detail below with reference to FIGS. 13 and 14.

4.9 Add Sample to Track Process

The process as executed at steps 1107 and 1209 begins at the first step 1301 where the processor 2305 adds the sample detected at step 505 to the media file 200. The process of step 1301 will be described more detail below with reference to the flow diagram of FIG. 14. The process of steps 1107 and 1209 concludes at the next step 1303, where the processor 2305 adds a reference to the sample to either the video track 213 or the text track 215, of the index file 205. The process of step 1303 will be described more detail below with reference to the flow diagram of FIG. 15.

4.10 Add Sample to Media File Process

The process of step 1301 is preferably implemented as software resident in the hard disk drive 2310 and being controlled in its execution by the processor 2305. The process of step 1301 begins at the first step 1401, where if the processor 2305 determines that the format of the media file 200 is AVI™ then the process proceeds to step 1403. Otherwise, the process of step 1301 proceeds directly to step 1419, where the data of the detected sample is written to the media file 200 configured within the hard disk drive 2310.

At step 1403, if the sample detected at step 505 is empty (i.e. the associated sample size is zero) then the process proceeds directly to step 1415. Otherwise, the process of step 1301 proceeds to step 1411.

At step 1411, the processor 2305 creates a custom data chunk containing a timestamp based on the detected sample recording time and writes the custom data chunk to the media file 200 configured within the hard disk drive 2310. At the next step 1413, the AVI™ index is updated with a reference to the custom data chunk stored in the media file 200.

At step 1415, the processor 2305 writes a data chunk based on the detected sample to the media file 200. The process of step 1301 concludes at the next step 1417 where the AVI™ index of the index file 205 is updated with a reference to the sample data chunk stored in the media file 200.

4.11 Add Sample Reference Process

Figure 15:
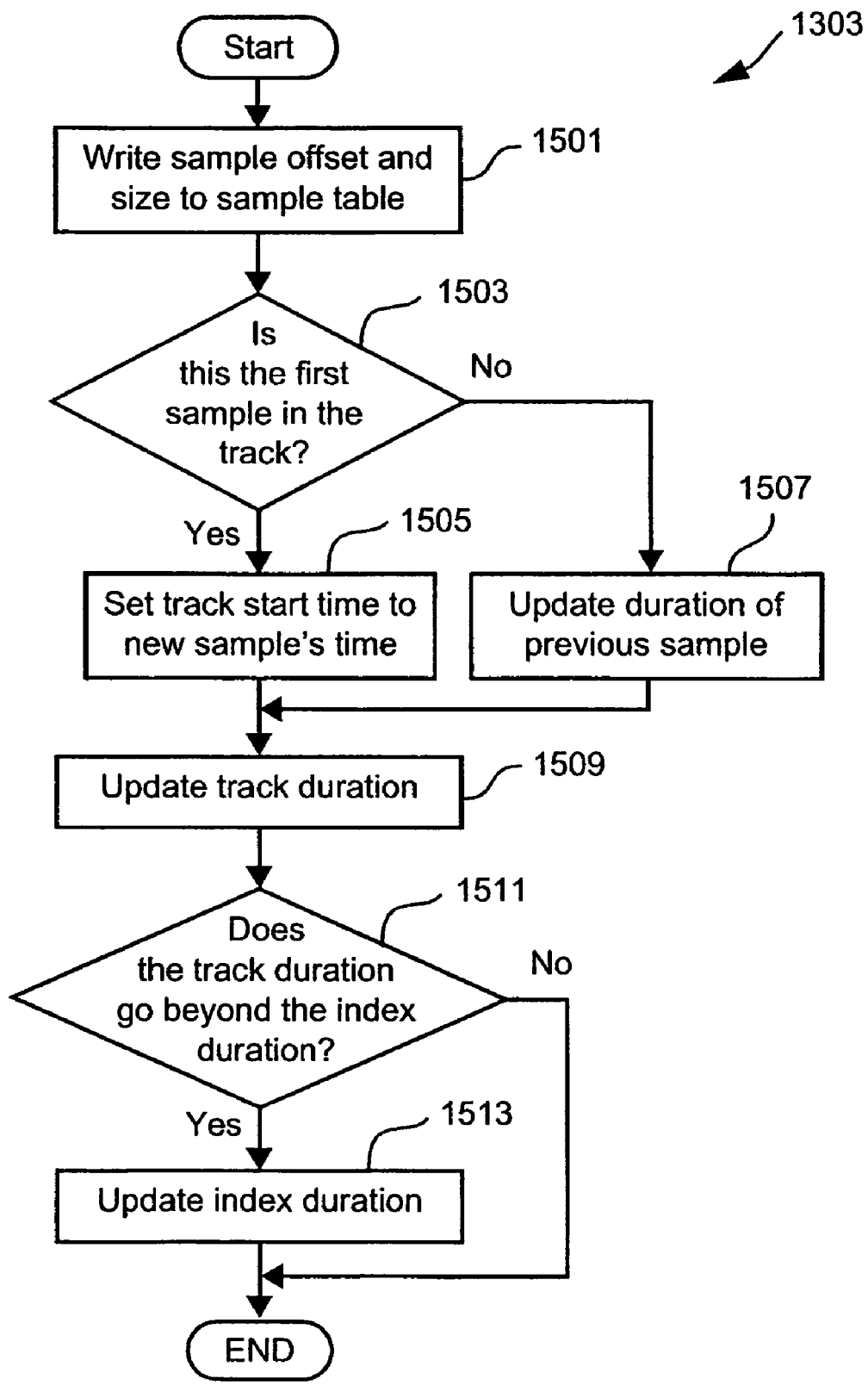
FIG. 15 is a flow diagram showing a process for adding a sample reference to an index file.

The process of step 1303 will now be described with reference to the flow diagram of FIG. 15. The process is preferably implemented as software resident in the hard disk drive 2310 and being controlled in its execution by the processor 2305. The process of step 1303 begins at the first step 1501 where the sample offset indicated by a sample offset parameter and sample size parameter, of the sample detected at step 505, is written to the sample table structure (i.e. the sample offset tables 209 or 217 and the sample size table 211 or 219) of the index file 205 track (i.e., either the video track 213 or the text track 215). At the next step 1503, if the sample is the first sample to be associated with the track then the process continues at the next step 1505. Otherwise, the process of step 1303 proceeds to step 1507.

At step 1505, the processor 2305 sets the starting time of the track to the timestamp of the current sample using the sample recording time parameter. Otherwise, the processor determines the duration of the previous sample by subtracting the timestamp of the previous sample from the timestamp of the current sample. Then at the next step 1509, a track duration value associated with the relevant track (i.e., the track 213 or 215) is set to the difference between the timestamp of the current sample and the starting time of the relevant track. At the next step 1511, if the track duration causes the end of the track to exceed the index duration, then the process proceeds to step 1513. Otherwise, the process of step 1303 concludes. At step 1513, the index duration is updated to accommodate the track and the process of step 1303 concludes.

4.12 Pad Media File Process

Figure 16:
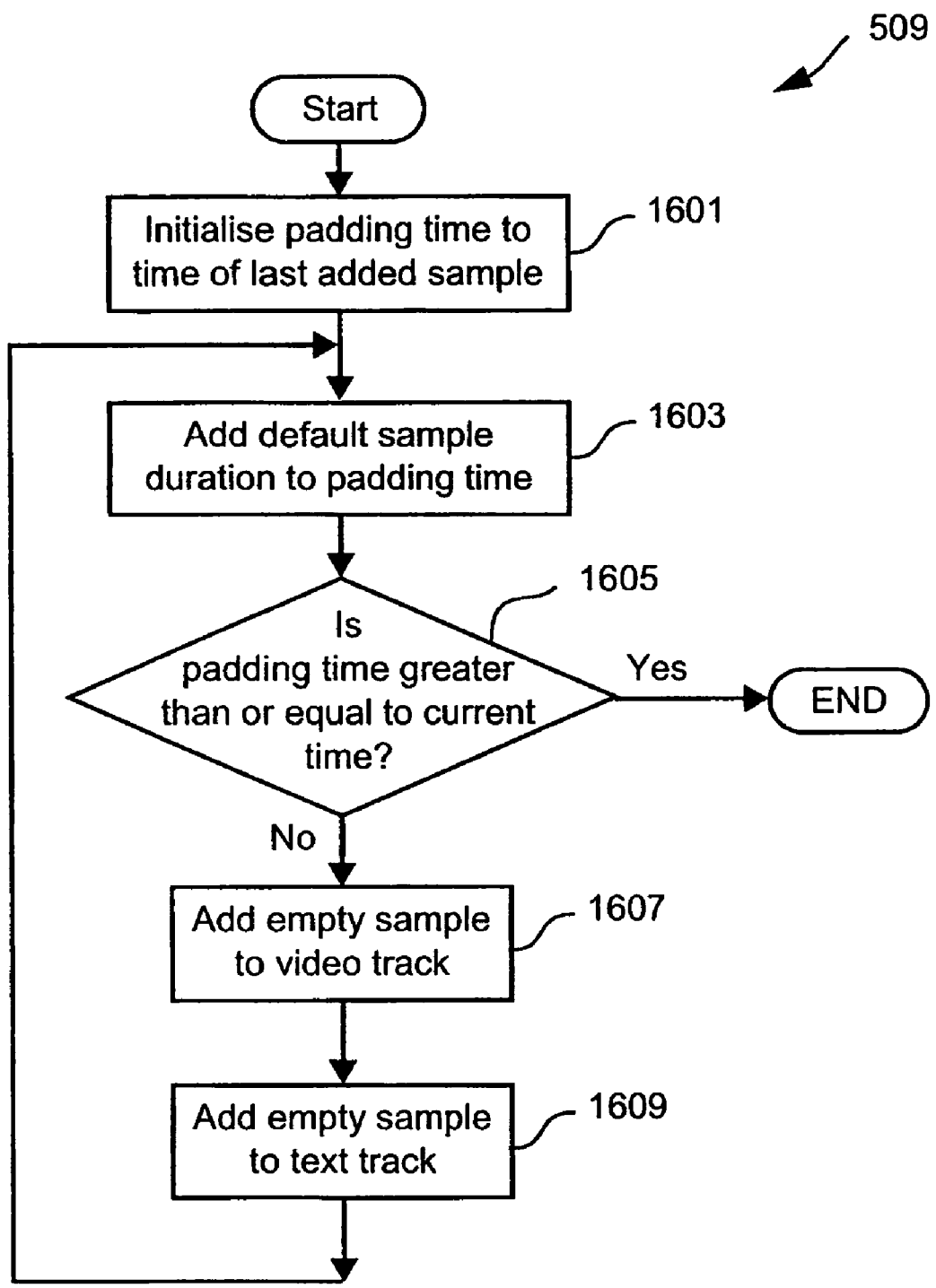
FIG. 16 is a flow diagram showing a process for adding empty samples for a media file.

The process of step 509 will now be described with reference to the flow diagram of FIG. 16. The process is preferably implemented as software resident in the hard disk drive 2310 and being controlled in its execution by the processor 2305. The process of step 509 begins at the first step 1601 where a variable referred to as the "padding time" variable is set to the time of the last added sample. At the next step 1603, the processor 2305 adds a predetermined sample duration value to the padding time variable using a current recording time parameter supplied by the processor 2305. Then at step 1605, if the processor 2305 determines that the value of the padding time variable is greater than or equal to the current sample time, then the process of step 509 concludes. Otherwise, the process continues at the next step 1607 where an empty sample of a duration equal to the predetermined sample duration is added to the media file 200. Further, an offset to the empty sample is added to the video track 213 of the index file 205. The process of step 509 continues at the next step 1609 where an offset to the empty sample is added to the text track 215 of the index file 205 and the process of step 509 returns to step 1603.

4.13 Complete Index File Process

Figure 17:
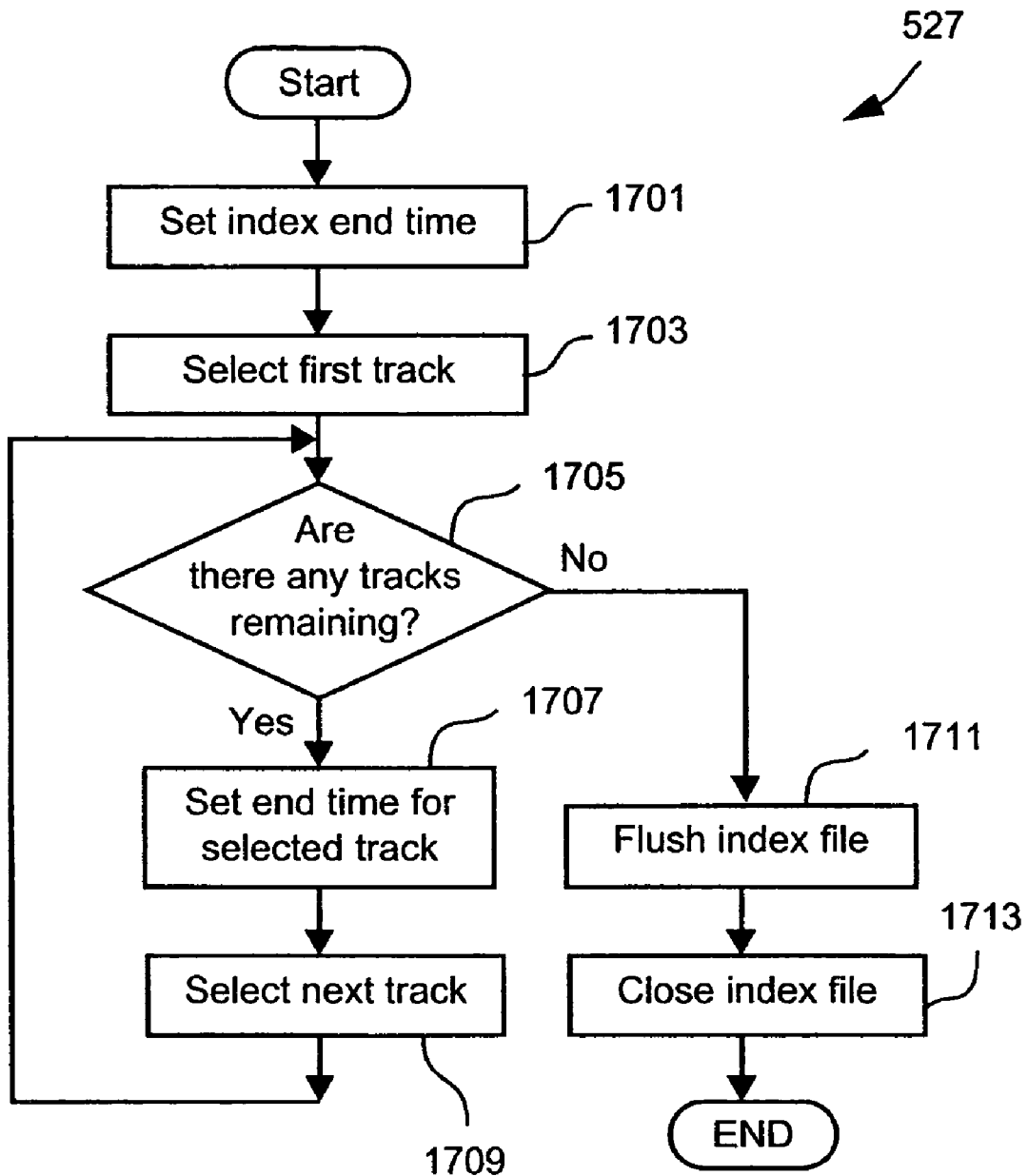
FIG. 17 is a flow diagram showing a process for completing an index file.

The process of step 527 will now be described with reference to the flow diagram of FIG. 17. The process is preferably implemented as software resident in the hard disk drive 2310 and being controlled in its execution by the processor 2305. The process of step 527 begins at the first step 1701 where the processor 2305 sets the end time of the index file 205 to an index end time value supplied by the processor 2305. At the next step 1703, the processor 2305 selects a first track of the index file 205. Then at step 1705 if the processor 2305 determines that there are any remaining tracks of the index file 205 to be processed the process of step 527 proceeds to step 1707. Otherwise, the process proceeds to step 1711. At step 1707, the end time for the selected track is set to the index end time supplied by the processor 2305. The next track of the index file 205 is then selected by the processor 2305 at step 1709 and the process of step 527 returns to step 1705.

At step 1711, the processor 2305 flushes any previously unwritten index file data in memory 2306 to the index file 205 configured in the hard disk drive 2310. The process of step 527 then concludes at the next step 1713, where the index file 205 is closed.

4.14 Complete Media File Process

Figure 18:
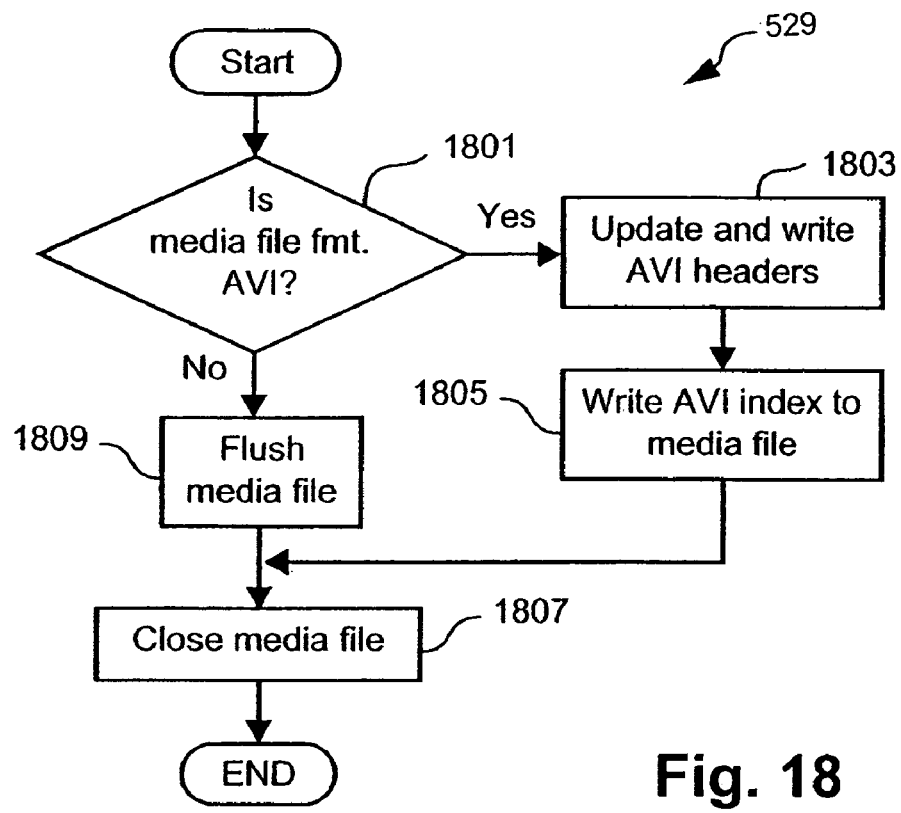
FIG. 18 is a flow diagram showing a process for completing a media file.

The process of step 529 will now be described with reference to the flow diagram of FIG. 18. The process is preferably implemented as software resident in the hard disk drive 2310 and being controlled in its execution by the processor 2305. The process of step 529 begins at the first step 1801, where if the processor 2305 determines that the media file 200 is formatted in accordance with the AVI™ file format, then the process of step 529 proceeds to step 1803. Otherwise, the process proceeds to step 1809 where any previously unwritten media file data in memory 2306 is flushed to the media file 200 configured within the hard disk drive 2310. After step 1809 the process of step 229 proceeds directly to step 1807. At step 1803, the processor 2305 updates the AVI™ headers of the media file 200 with information about the samples stored in the media file 200. At the next step 1805, the AVI™ index file 205 is written to the end of the media file 200. The process of step 529 concludes at the next step 1807 where the media file 200 is closed.

4.15 Configure Track Process

Figure 19:
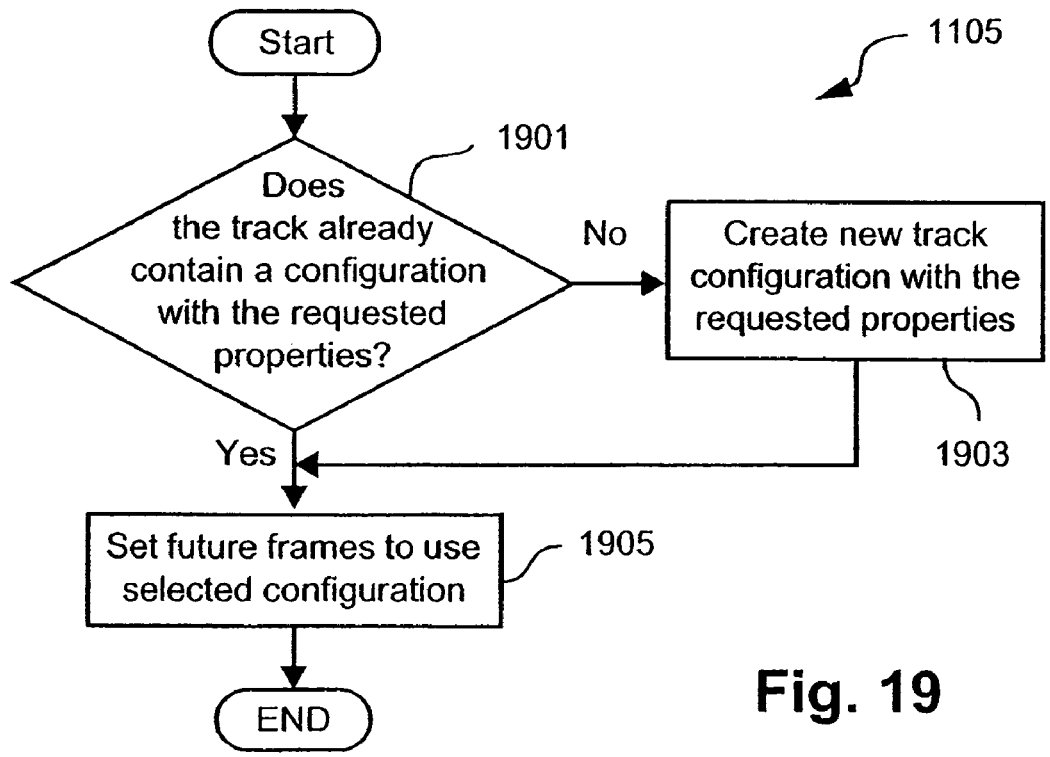
FIG. 19 is a flow diagram showing a process for configuring a track.

The process of step 1105 will now be described with reference to the flow diagram of FIG. 19. The process is preferably implemented as software resident in the hard disk drive 2310 and being controlled in its execution by the processor 2305. The process of step 1105 begins at the first step 1901, where if the video track 213 of the index file 205 is configured in accordance with the properties of the current sample (i.e., the current frame), then the process of step 1105 proceeds to step 1905. Otherwise, the processor 2305 checks a list configured within memory 2306 to determine if the requested combination of file format (i.e., indicated by a data encoding parameter) and frame dimensions (i.e., indicated by a frame dimensions parameter), is present in the list. If the requested combination is not present in the list, then the processor 2305 creates a new track configuration in accordance with the requested properties and stores the new configuration in the list. The process then proceeds to step 1905 where the processor 2305 sets the video track configuration to the configuration of the current sample or to the new configuration created at step 1903. The process of step 1105 then concludes.

5.0 Media and Index File Recovery

In the event of system failure of the storage server 2300 occurring (e.g. due to a power failure), the contents of the index file 205 may not be entirely consistent with all of the data that was stored in the associated media file 200 before the system failure. As long as the data of the index file 205 was regularly flushed to the hard disk drive 2210, the impact of such a system failure is not as severe. However, the data that was saved to the media file 200 after a most recent flush can be lost.

Additionally, corruption of the media file 200 can occur, in that any metadata of the media file 200 may not be consistent with the contents of the file 200. As such, the media file 200 is unplayable in a standard media player. For example, if the media file 200 is in AVI™ format, the size of the sample list of the media file, which is typically updated only when recording to the file 200 has finished, will not be consistent with the contents of the sample list.

As an example, FIG. 4(a) shows a sample list chunk 400 from a corrupt AVI™ file, where the recorded size of the sample list chunk 400 is represented by the arrow 405. In the file of FIG. 4(a), the recorded size of the sample list chunk 400 does not match the actual size of the sample list chunk 400. In contrast, FIG. 4(b) shows a similar portion of a valid AVI™ file, where the recorded size of a corresponding sample list chunk 401 is represented by the arrow 407. In this example, an AVI™ index chunk cannot be written to the end of the file of FIG. 4(a) since the processor 2305 of the storage server 2300 is not able to ascertain where the end of the file of FIG. 4(a) is located. However, an AVI™ index chunk can be written to the end of the file of FIG. 4(b) since the processor 2305 can determine where the end of the file is using the recorded size of the sample list chunk 401.

As described above, additional, non-standard, information inserted into the media file (e.g. the file 401) at various points during the capturing and storing of the samples, can ensure that a corrupt media file (e.g. the file 400) can still be reconstructed. Likewise, a fresh index file that references all samples that were written to the media file 401 before a system failure, can be created.

For example, as described above, when a media file such as the media file 401 is in AVI™ format, CNVD sample chunks (e.g. the chunk 403) can be inserted into the file 401 during recording in order to provide timestamps for each frame of video data captured by the cameras 110 to 113. As a result, the index file 401 can contain information on frame rate variation, which is not present in a conventional AVI™ file.

As described in detail below, the media file 200 is read by the processor 1305 and if the media file 200 was not closed correctly, the processor 2305 closes the media file 200 in accordance with the process of step 529. The processor 2305 then reconstructs a new index file in memory 2306 based on data stored in the media file 200. The existing index file 205 configured within the hard disk drive 2310 is then replaced with the new index file.

5.1 Recover Media and Index Files Routines

Figure 20:
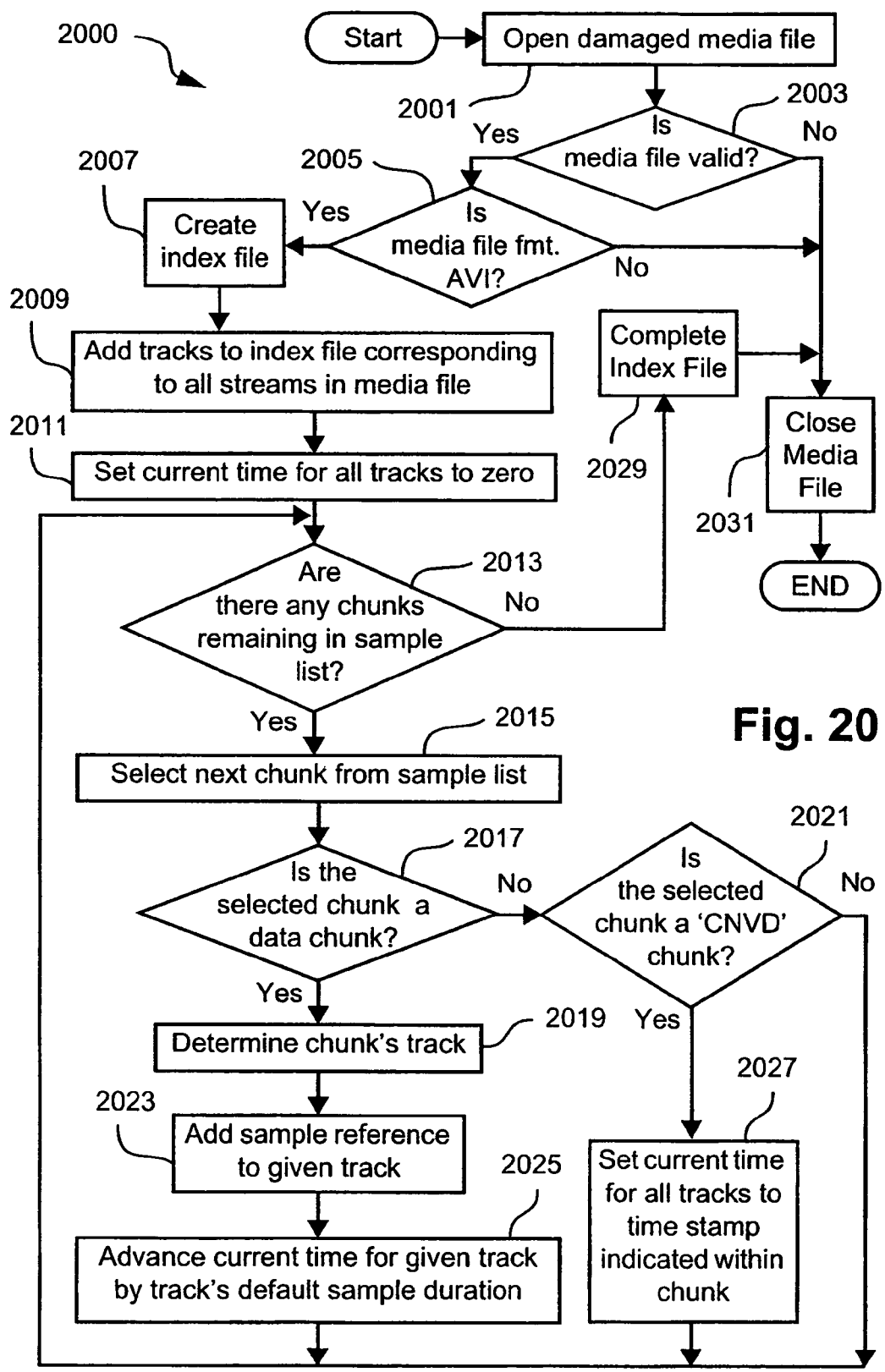
FIG. 20 is a flow diagram showing a process for recovering media and index files.

A process 2000 for recovering damaged media and index files will now be described with reference to the flow diagram of FIG. 20. The process is preferably implemented as software resident in the hard disk drive 2310 and being controlled in its execution by the processor 2305. The process 2000 restores a damaged media file and associated index files into a consistent and incorrupt state.

The process 2000 begins at the first step 2001, where the processor 2305 opens a damaged media file configured within the hard disk drive 2310 and determines whether the format of the damaged file can be recognised. The name of the damaged media file can be provided to the processor 2305 in a command line argument, for example, input via the keyboard 2302. The process of step 2001 will be described in more detail below with reference to the flow diagram of FIG. 21.

The process 2000 continues at the next step 2003 where the processor 2305 determines if the damaged media file is valid. The damaged media file is considered to be valid if the media file is in a state from which the associated index file can be rebuilt. If the processor 2305 determines that the damaged media file is valid at step 2003, then the process 2000 proceeds to the next step 2005. Otherwise, the process proceeds to step 2031. At step 2005, if the processor 2305 determines that the damaged media file is configured in accordance with the AVI™ file format, then the process proceeds to step 2007. Otherwise, the process proceeds to step 2031.

At step 2007, the processor 2305 creates an index file, in accordance with the process of step 603, described above with reference to FIG. 8. At the next step 2009, tracks are added to the newly created index file in accordance with the process of step 605 described above with reference to FIG. 9. The created index file is created with one or more tracks depending on the samples present within the damaged media file.

The process 2000 continues at the next step 2011 where the processor 2305 sets the current time for all tracks of the media file to zero. At the next step 2013, the processor 2305 cycles through the sample list of the media file and if there are any unprocessed samples (i.e., chunks) remaining in the sample list, then the process proceeds to step 2015. Otherwise, the process proceeds to step 2029 where the newly created index file is completed in accordance with the process of step 527, described above with reference to FIG. 17. Following step 2029, the process 2000 proceeds step 2031.

At step 2015, the processor 2305 selects a next sample (i.e., chunk) from the sample list. Then at step 2017, if the selected sample is a data sample (i.e., a video or text data sample), the process proceeds step 2019. Otherwise, the process proceeds to step 2021, where if the selected sample is a "CNVD" chunk, then the process 2000 proceeds to step 2027. If the selected sample is not a CNVD chunk, then the process returns to step 2013. At step 2027, the current time for all tracks of the newly created index file is set to the value of a time stamp indicated within the selected sample and the process 2000 returns to step 2013.

At step 2019, the processor 2305 determines the track of the newly created index file, corresponding to the selected sample. Then at the next step 2023, a reference corresponding to the selected sample is added to the associated track, in accordance with the process of step 1303 described above with reference to FIG. 15. Then at step 2025, the current time for the selected track is advanced by a default sample duration corresponding to the associated track and the process returns to step 2013.

Once all of the samples within the sample list have been processed, the media file is closed at step 2031 and the process 2000 concludes.

5.2 Open Damaged Media File Process

Figure 21:
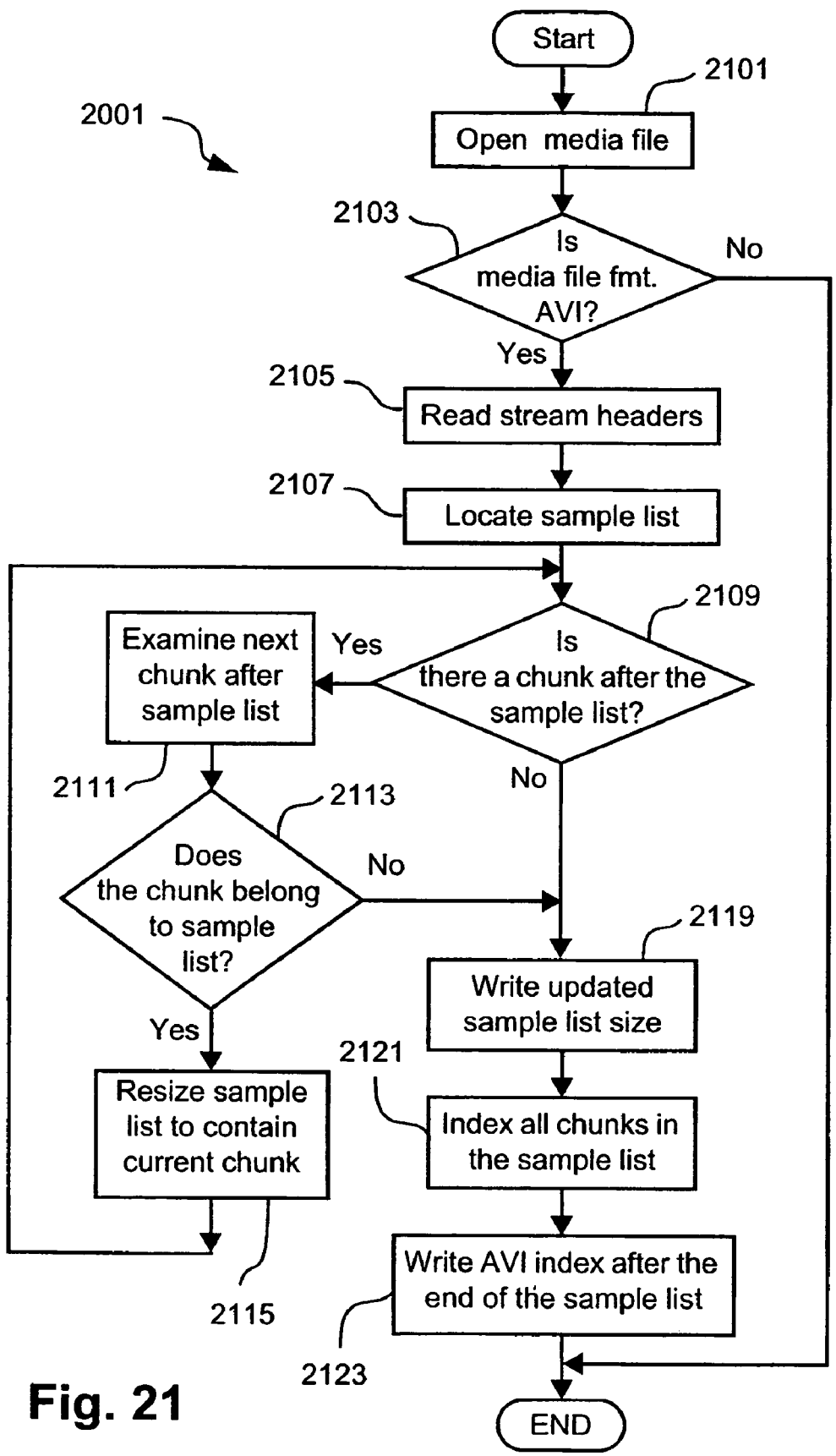
FIG. 21 is a flow diagram showing a process for opening a damaged media file.

The process of step 2001 for opening damaged media files will now be described with reference to the flow diagram of FIG. 21. The process of step 2001 is preferably implemented as software resident in the hard disk drive 2310 and being controlled in its execution by the processor 2305. The process of step 2001 begins at the first step 2101, where the processor 2305 opens a damaged media file indicated by a media file name supplied by the processor 2305 and being configured within the hard disk drive 2310. At the next step 2103, if the processor 2305 determines that the damaged media file is configured in accordance with the AVI™ file format, then the process proceeds to step 2105. Otherwise, the process of step 2001 concludes.

At step 2105, the processor 2305 reads the headers corresponding to each of the streams of the damaged media file, in order to determine the nature (i.e., video or text) of the samples contained within the damaged media file. At the next step 2107, the processor 2305 locates the sample list of the damaged media file. Then at the next step 2109, if the processor 2305 determines that there is a chunk after the sample list, the process of step 2001 proceeds to step 2111. Otherwise, the process proceeds to step 2119. At step 2111, the processor 2305 examines the chunk following the sample list. If the chunk belongs to the sample list at the next step 2113, then the process of step 2001 proceeds to step 2115. Otherwise, the process to step 2119.

At step 2115, the sample list is resized to contain the chunk and the process of step 2001 returns to step 2109. Thus, the sample list is continually resized until either the end of the media file is reached, or a sample is encountered that does not belong inside the sample list (e.g. the AVI™ index).

At step 2119, the processor 2305 writes the final size of the sample list to the media file configured within the hard disk drive 2310. At the next step 2121, an AVI™ index file is generated to reference the offsets and sizes of each sample within the sample list. The process of step 2001 concludes at the next step 2123 where the AVI™ index is appended to the end of the sample list.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather than sequentially.

The methods described above may alternatively be implemented in dedicated hardware such as one or more integrated circuits performing the functions or sub functions of described processes. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiments being illustrative and not restrictive.

The claims defining the invention are as follows:

1. A method of generating a media file for display on a display device, said method comprising the steps of:
 (a) initializing the media file and an associated index file, the associated index file referencing the media file;
 (b) inserting a plurality of video frames from a camera into the media file, wherein said inserting step comprises the steps of:
  (i) determining if the media file is configured to accept the plurality of video frames; and
  (ii) configuring the media file, based on said determination step, such that the plurality of video frames is accepted by the media file; and
 (c) appending a text string comprising at least a time stamp of said inserting step to the plurality of video frames, to thereby generate the media file, the text string being adapted for reconstructing the associated index file upon corruption of the associated index file, wherein the reconstructed index file replaces the associated index file,
 and wherein upon the media file and the associated index file being damaged, performing the following steps:
 (d) adding at least one track to the reconstructed index file;

(e) determining if a portion of the media file in the damaged media file is the text string or the plurality of video frames;
(f) if the portion of the media file is the text string, setting a current time of the track of the reconstructed index file to a time stamp of the text string;
(g) if the portion of the media file is the plurality of video frames, executing the sub-steps of:
  (i) resizing the media file to contain the plurality of video frames; and
  (ii) advancing the current time of the track of the reconstructed index file by a default duration associated with the track;
(h) repeating steps (d) to (g) until a portion of the media file that does not belong to the media file is encountered; and
(i) replacing the associated index file with the reconstructed index file that references at least one portion of the media file.

2. An apparatus for generating a media file for display on a display device, said apparatus comprising:
(a) initializing means for initializing the media file and an associated index file, the associated index file referencing the media file;
(b) inserting means for inserting a plurality of video frames from a camera into the media file, wherein said inserting means comprises:
  (i) first determining means for determining if the media file is configured to accept the plurality of video frames; and
  (ii) configuring means for configuring the media file, based on the determination, such that the plurality of video frames is accepted by the media file;
(c) appending means for appending a text string comprising at least a time stamp of the insertion to the plurality of video frames to thereby generate the media file, the text string being adapted for reconstructing the associated index file upon corruption of the associated index file, wherein the reconstructed index file replaces the associated index file,
and wherein upon the media file and the associated index file being damaged,
(d) an adding means adds at least one track to the reconstructed index file;
(e) second determining means determines if a portion of the media file in the damaged media file is the text string or the plurality of video frames;
(f) if the portion of the damaged media file is the text string, setting means sets a current time of the track of the reconstructed index file to a time stamp of said text string;
(g) if the portion of the damaged media file is the plurality of video frames, resizing means resizes the media file to contain the plurality of video frames, and time advancing means advances the current time of the track of the reconstructed index file by a default duration associated with the track;
(h) processing means processes the media file until a portion of the media file that does not belong to the media file is encountered; and
(i) replacing means replaces the associated index file with the reconstructed index file that references at least one portion of the media file.

3. A computer readable storage device having recorded thereon a computer program for generating a media file for display on a display device, said computer program comprising:
(a) code for initializing the media file and an associated index file, the associated index file referencing the media file;
(b) code for inserting a plurality of video frames from a camera into the media file, wherein said code for inserting comprises:
  (i) code for determining if the media file is configured to accept the plurality of video frames; and
  (ii) code for configuring the media file, based on the determination, such that the plurality of video frames is accepted by the media file; and
(c) code for appending a text string comprising at least a time stamp of the insertion to the plurality of video frames to thereby generate the media file, the text string being adapted for reconstructing the associated index file upon corruption of the associated index file, wherein the reconstructed index file replaces the associated index file,
wherein, upon the media file and the associated index file being damaged,
(d) code for adding adds at least one track to the reconstructed index file; and
(e) code for determining determines if a portion of the media file in the damaged media file is the text string or the plurality of video frames;
(f) if the portion of the media file is the text string, code for setting sets a current time of the track of the reconstructed index file to a time stamp of the text string;
(g) if the portion of the media file is the plurality of video frames, code for resizing resizes the media file to contain the plurality of video frames, and code for advancing advances the current time of the track of the reconstructed index file by a default duration associated with the track;
(h) code for processing processes the media file until a portion of the media file that does not belong to the media file is encountered; and
(i) code for replacing replaces the associated index file with the reconstructed index file that references at least one portion of the media file.

* * * * *